United States Patent
Kaji

(10) Patent No.: US 9,787,123 B2
(45) Date of Patent: Oct. 10, 2017

(54) CHARGE/DISCHARGE CONTROL DEVICE AND CHARGE/DISCHARGE CONTROL METHOD

(71) Applicant: Panasonic Intellectual Property Management Co., Ltd., Osaka (JP)

(72) Inventor: Mitsuru Kaji, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 279 days.

(21) Appl. No.: 14/848,246

(22) Filed: Sep. 8, 2015

(65) Prior Publication Data

US 2015/0380956 A1     Dec. 31, 2015

Related U.S. Application Data

(63) Continuation of application No. PCT/JP2014/003566, filed on Jul. 4, 2014.

(30) Foreign Application Priority Data

Jun. 6, 2014   (JP) .................................. 2014-118003

(51) Int. Cl.
   *H02J 7/00*      (2006.01)
   *H02J 7/14*      (2006.01)
   (Continued)

(52) U.S. Cl.
   CPC ................ *H02J 7/007* (2013.01); *H02J 3/32* (2013.01); *H01M 10/44* (2013.01); *H01M 10/446* (2013.01); *H02J 3/14* (2013.01)

(58) Field of Classification Search
   USPC ....... 320/134, 135, 136, 107, 127, 128, 108, 320/132, 152, 157, 159, 124
   See application file for complete search history.

(56) References Cited

U.S. PATENT DOCUMENTS

| | | | |
|---|---|---|---|
| 6,511,773 B1 * | 1/2003 | Dampier | H01M 4/582 320/124 |
| 8,493,030 B2 * | 7/2013 | Paice | H02J 3/32 320/132 |

(Continued)

FOREIGN PATENT DOCUMENTS

| | | |
|---|---|---|
| JP | 2008-178215 | 7/2008 |
| JP | 2011-055671 | 3/2011 |

OTHER PUBLICATIONS

International Search Report of PCT application No. PCT/JP2014/003566 dated Aug. 5, 2014.

*Primary Examiner* — Alexis Pacheco
(74) *Attorney, Agent, or Firm* — Greenblum & Bernstein, P.L.C.

(57) ABSTRACT

A charge/discharge control device according to an aspect of the present disclosure is equipped with a system frequency measurer 303 that measures a system frequency, a base frequency updater 304 that updates a base frequency, a frequency bias calculator 305 that calculates a frequency bias indicating the difference between the base frequency and the system frequency, a charge/discharge command value decider 306 that uses the frequency bias to decide a power command value, and a charge/discharge controller 307 that causes a power storage system to charge/discharge power. The base frequency updater 304 determines whether or not reverse operation will occur, and in the case of determining that reverse operation will not occur, updates the base frequency so that the base frequency matches a frequency obtained by applying a low-pass filter to a temporal variation of the system frequency, while in the case of determining that reverse operation will occur, updates the base frequency so that the base frequency matches the system frequency.

16 Claims, 18 Drawing Sheets

Figure 1:
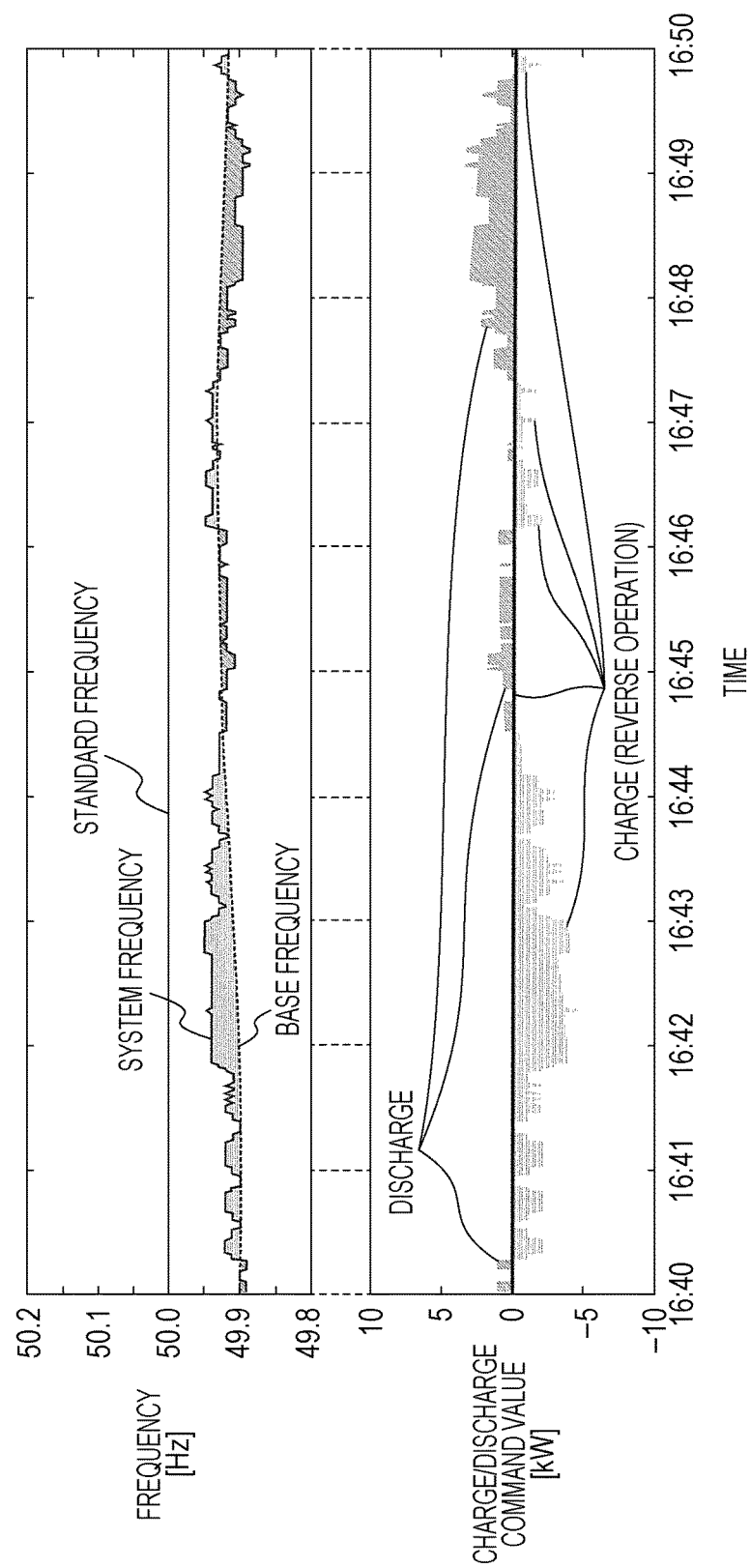

(51) Int. Cl.
*H02J 3/32* (2006.01)
*H01M 10/44* (2006.01)
*H02J 3/14* (2006.01)

(56) References Cited

U.S. PATENT DOCUMENTS

| | | | | |
|---|---|---|---|---|
| 2010/0072817 A1* | 3/2010 | Hirst | ............... | H02J 3/14 |
| | | | | 307/31 |
| 2011/0077792 A1 | 3/2011 | Shimoda et al. | | |
| 2014/0255784 A1* | 9/2014 | Zhang | ............. | H01G 9/07 |
| | | | | 429/231.6 |
| 2016/0052405 A1* | 2/2016 | Koizumi | ............ | H02J 5/005 |
| | | | | 320/108 |

* cited by examiner

CHARGE/DISCHARGE CONTROL DEVICE AND CHARGE/DISCHARGE CONTROL METHOD

TECHNICAL FIELD

The present disclosure relates to a charge/discharge control device and the like that controls charging/discharging of a power storage system.

BACKGROUND ART

In the related art, the technologies described in PTL 1 and PTL 2 are technologies for controlling charging/discharging of a power storage system (such as a storage battery).

CITATION LIST

Patent Literature

PTL 1: Japanese Unexamined Patent Application Publication No. 2008-178215
PTL 2: Japanese Unexamined Patent Application Publication No. 2011-55671

SUMMARY OF INVENTION

However, in the case in which a power storage system is used to conduct frequency regulation (FR) to regulate the frequency of a power system, there is a possibility that the frequency of the power system may move farther away from the standard frequency due to reverse charge/discharge operations.

Accordingly, the present disclosure provides a charge/discharge control device and the like able to minimize the occurrence of reverse operations in a storage battery for frequency regulation.

In one general aspect, the techniques disclosed here feature a charge/discharge control device includes: a frequency measurer that measures a system frequency of a power system per a predetermined control period; a base frequency updater that update a base frequency per the control period according to the system frequency; a first frequency deviation calculator that calculates a first frequency deviation per the control period, the first frequency deviation indicating a difference between the base frequency and the system frequency; a command value determiner that determines a first power command value that indicates a charge/discharge power to make the system frequency approach the base frequency according to the first frequency deviation; and a charge/discharge controller that causes a power storage system to charge/discharge power according to the first power command value. The base frequency updater determines whether or not reverse operation will occur in the power storage system according to the base frequency, the system frequency, and a standard frequency of the power system, the reverse operation being charging/discharging that corresponds to a direction that moves the system frequency farther away from the standard frequency, in a case of determining that the reverse operation will not occur, sets a frequency obtained by applying a low-pass filter to temporal variation of the system frequency to the base frequency, and in a case of determining that the reverse operation will occur, sets the system frequency to the base frequency.

Note that these general or specific aspects may also be realized by a system, method, integrated circuit, computer program, or non-transitory computer-readable recording medium such as a CD-ROM disc, and may also be realized by an arbitrary combination of a system, method, integrated circuit, computer program, and recording medium.

A charge/discharge control device of the present disclosure may minimize the occurrence of reverse operations.

Figure 2:
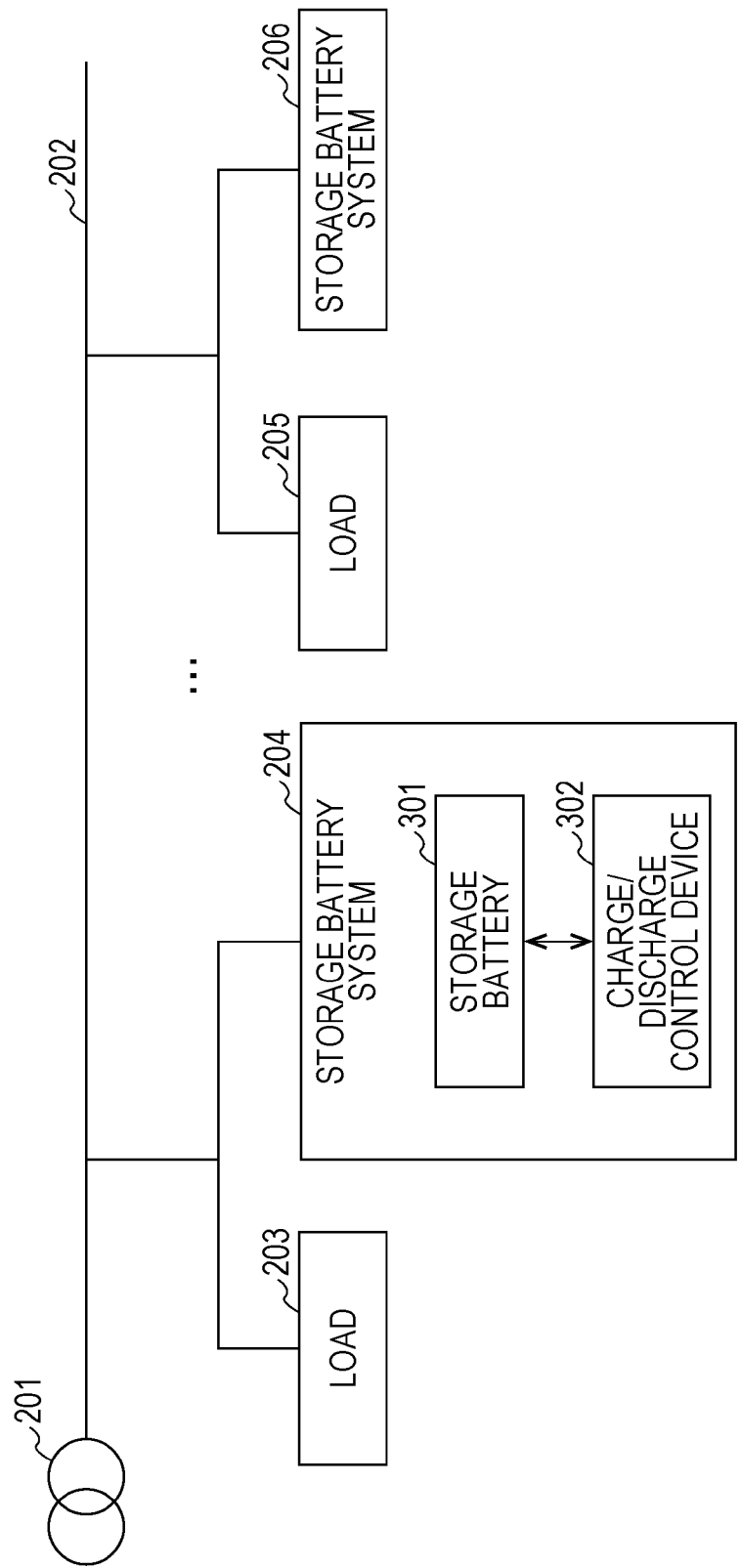
Figure 3:
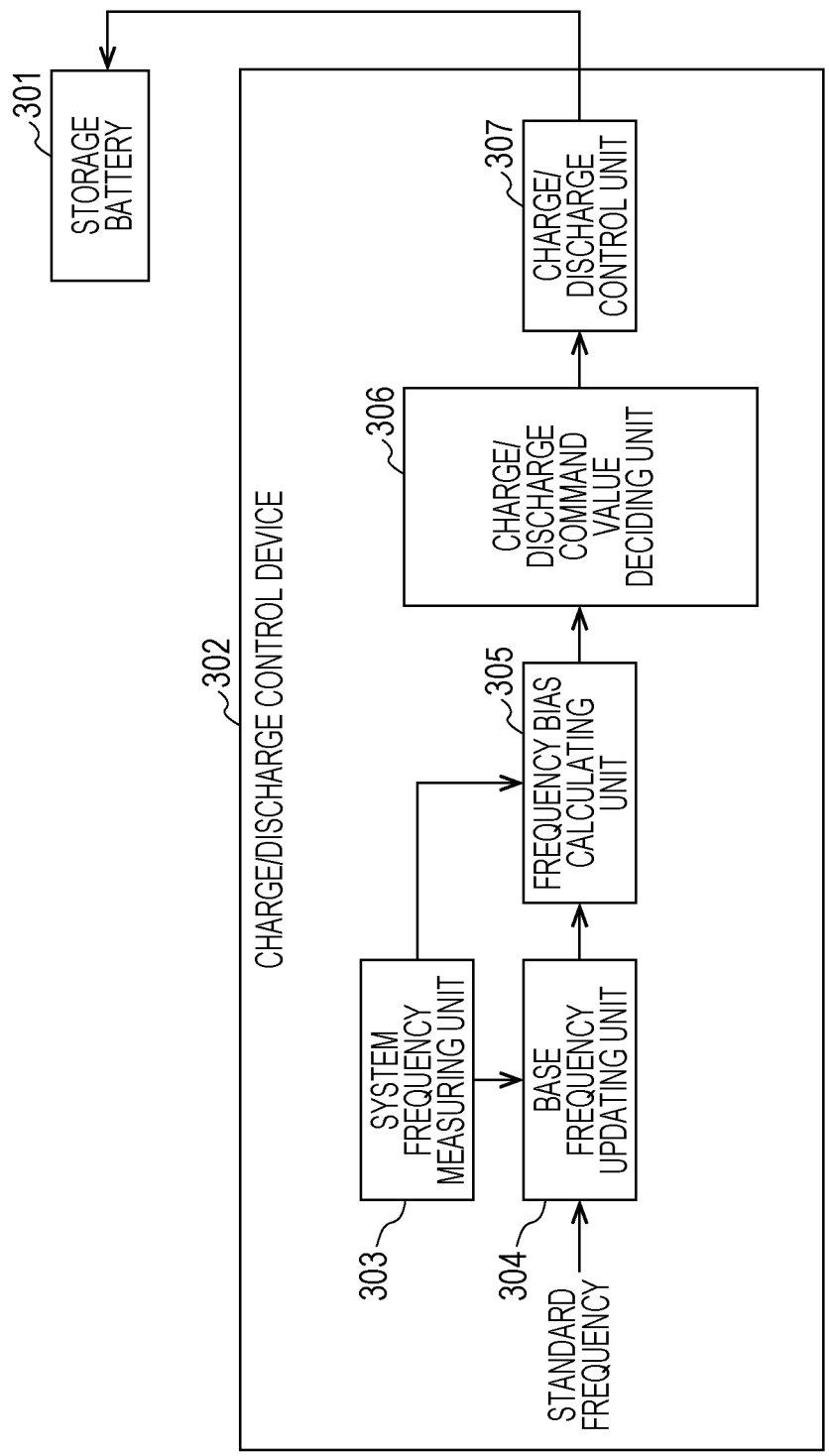
Figure 4:
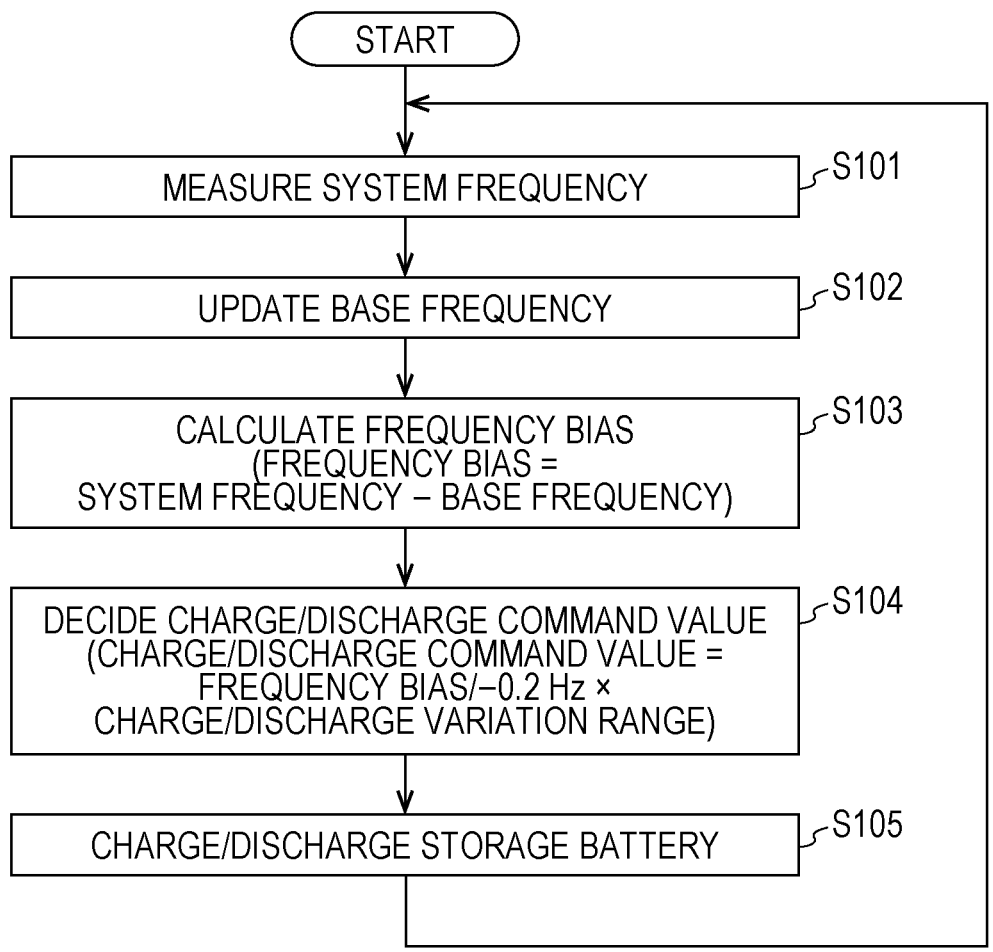
Figure 5:
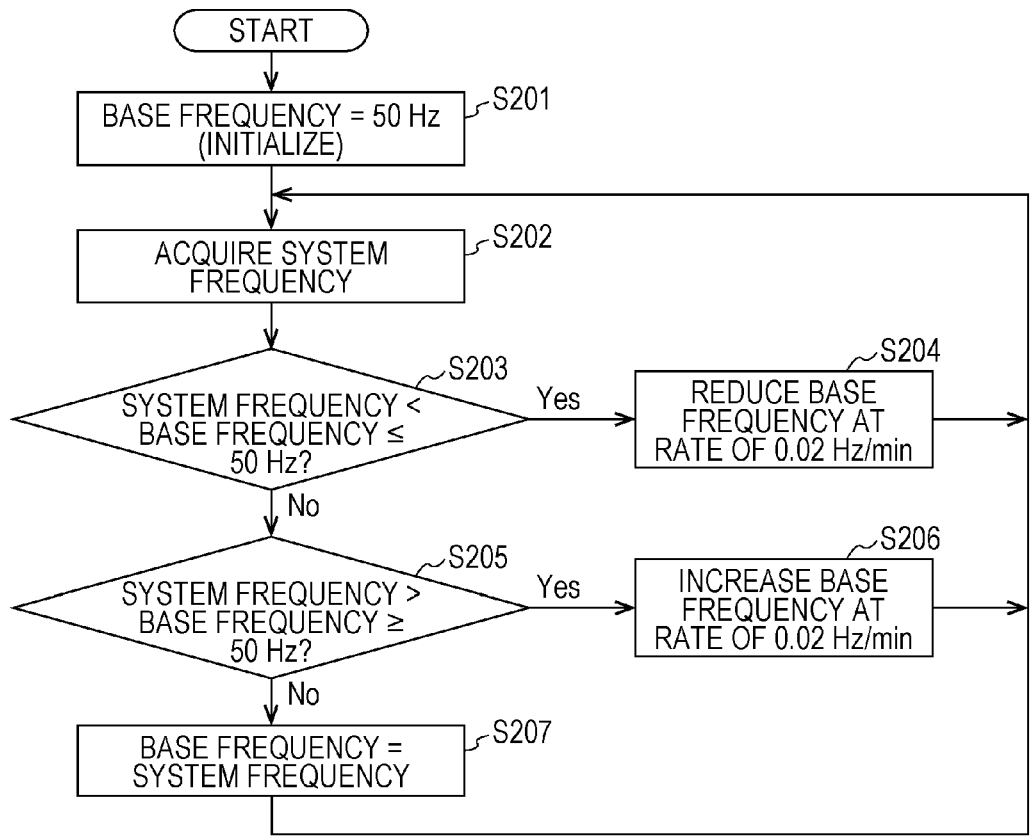
Figure 6:
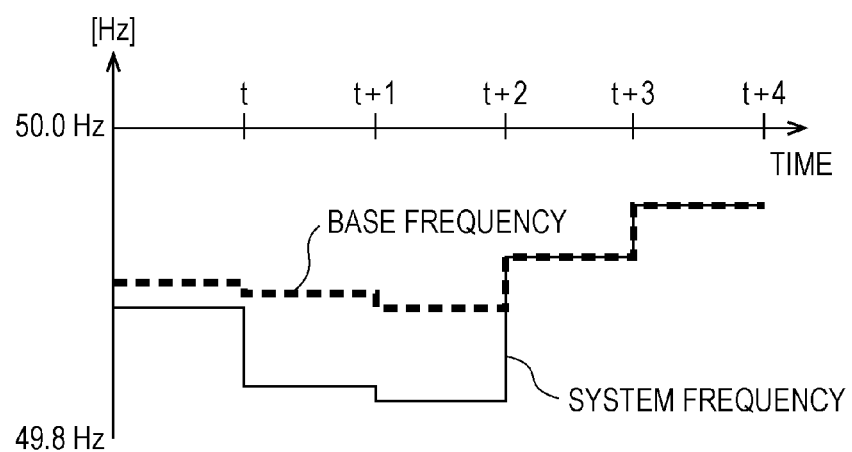
Figure 7:
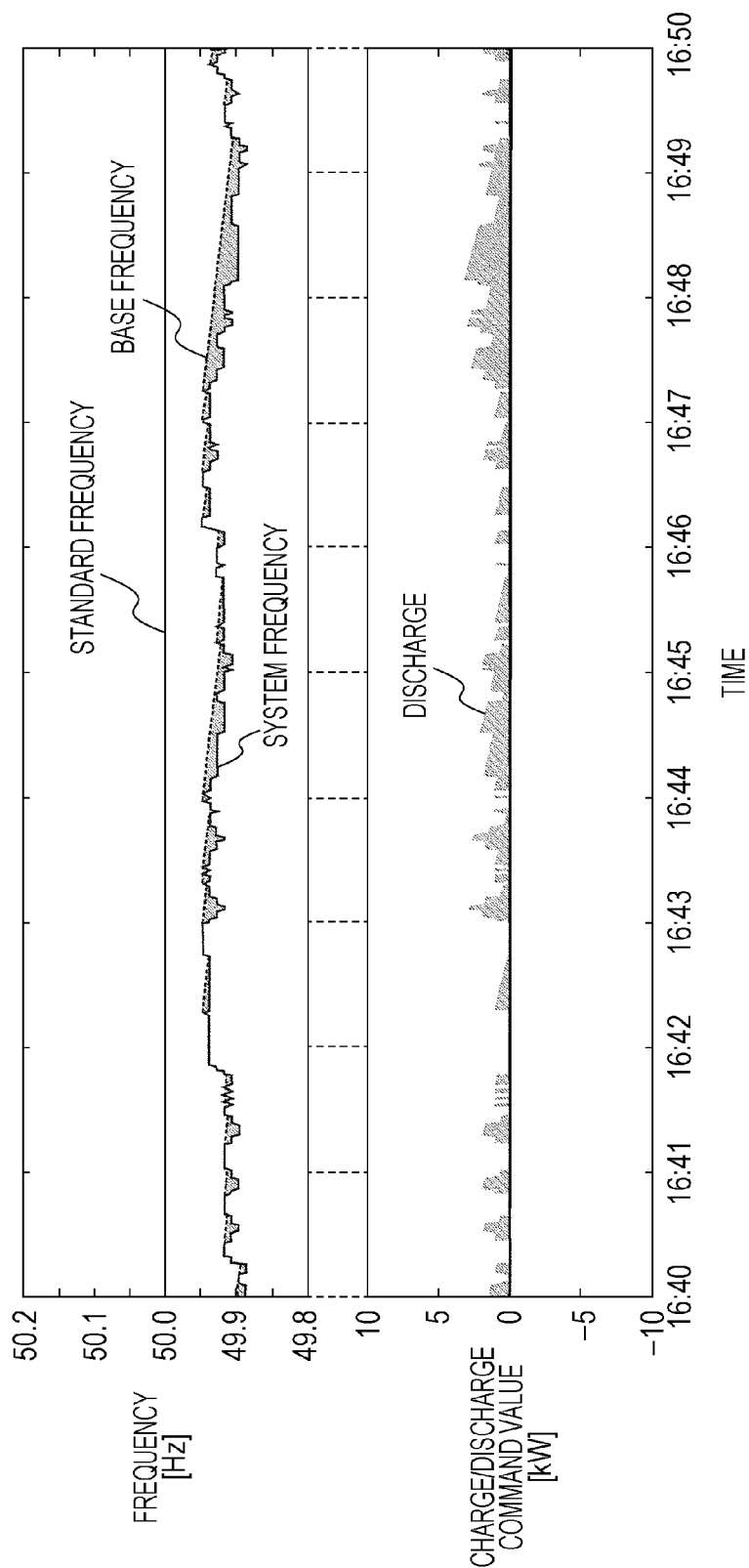
Figure 8:
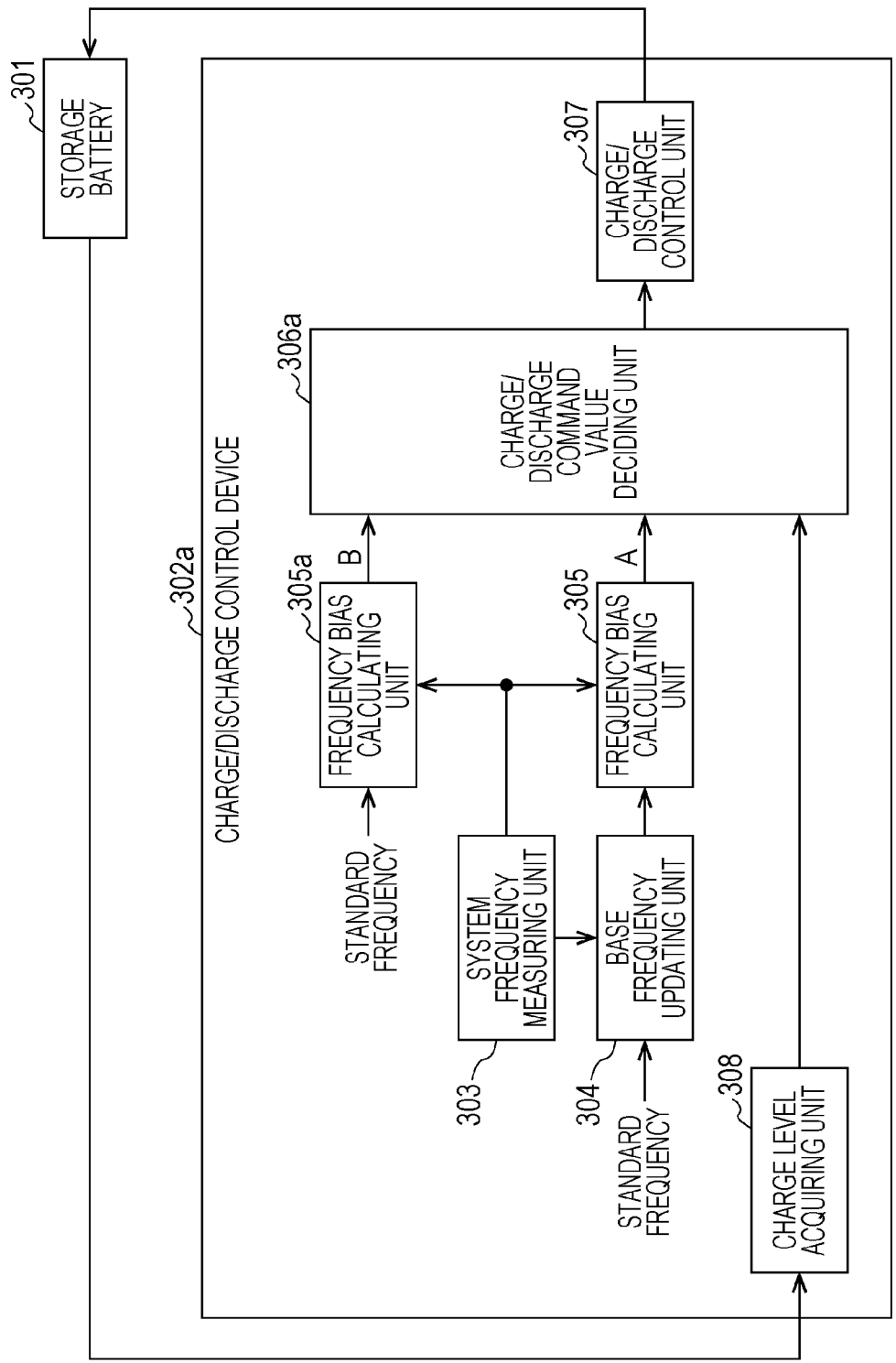
Figure 9:
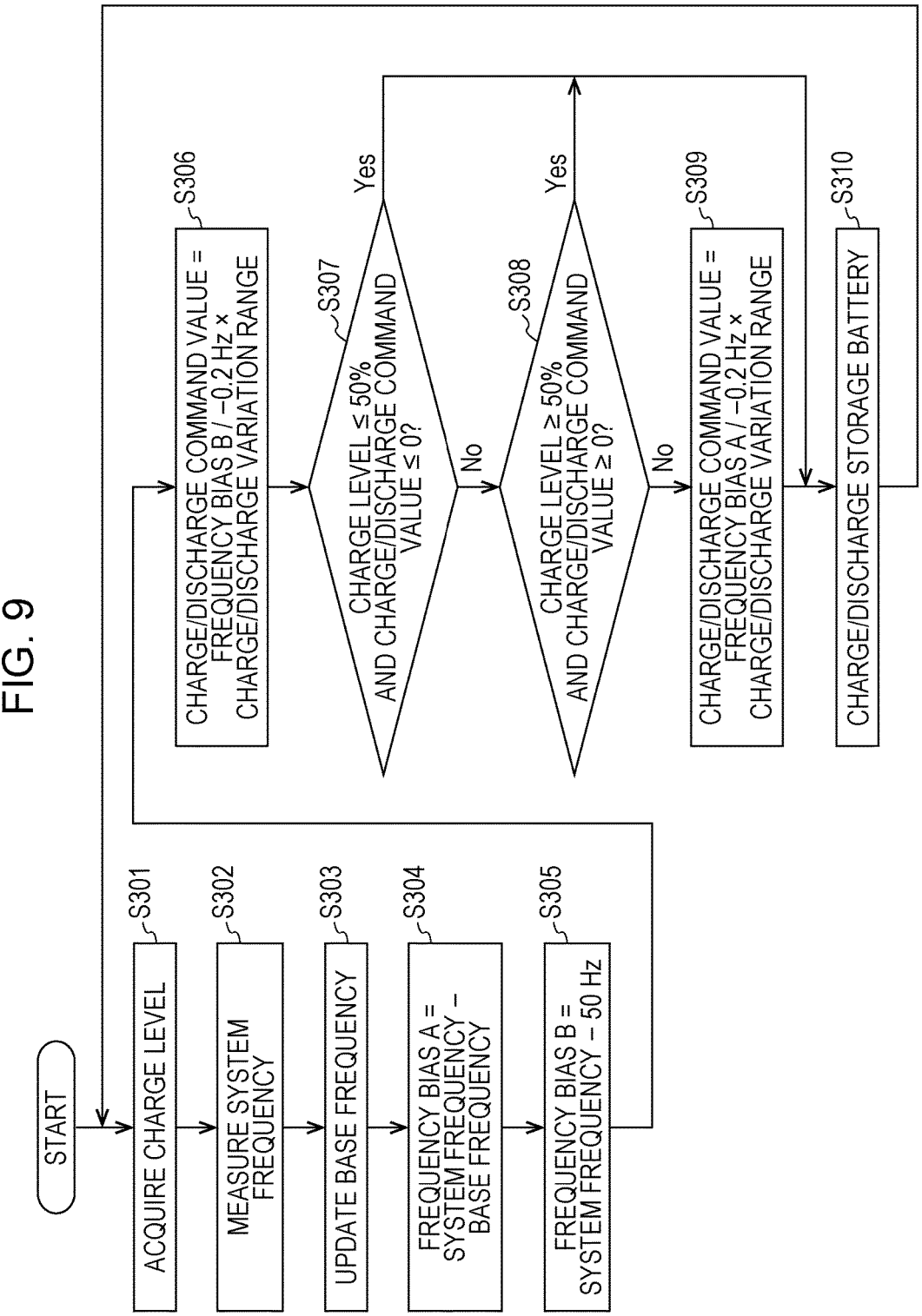
Figure 10:
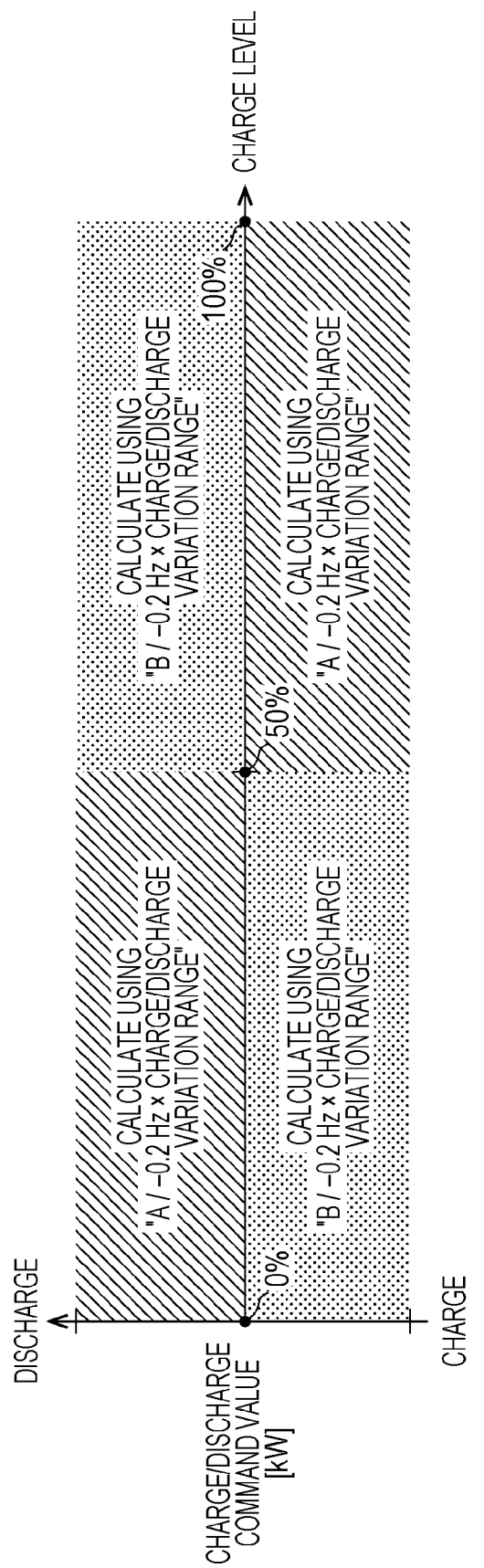
Figure 11:
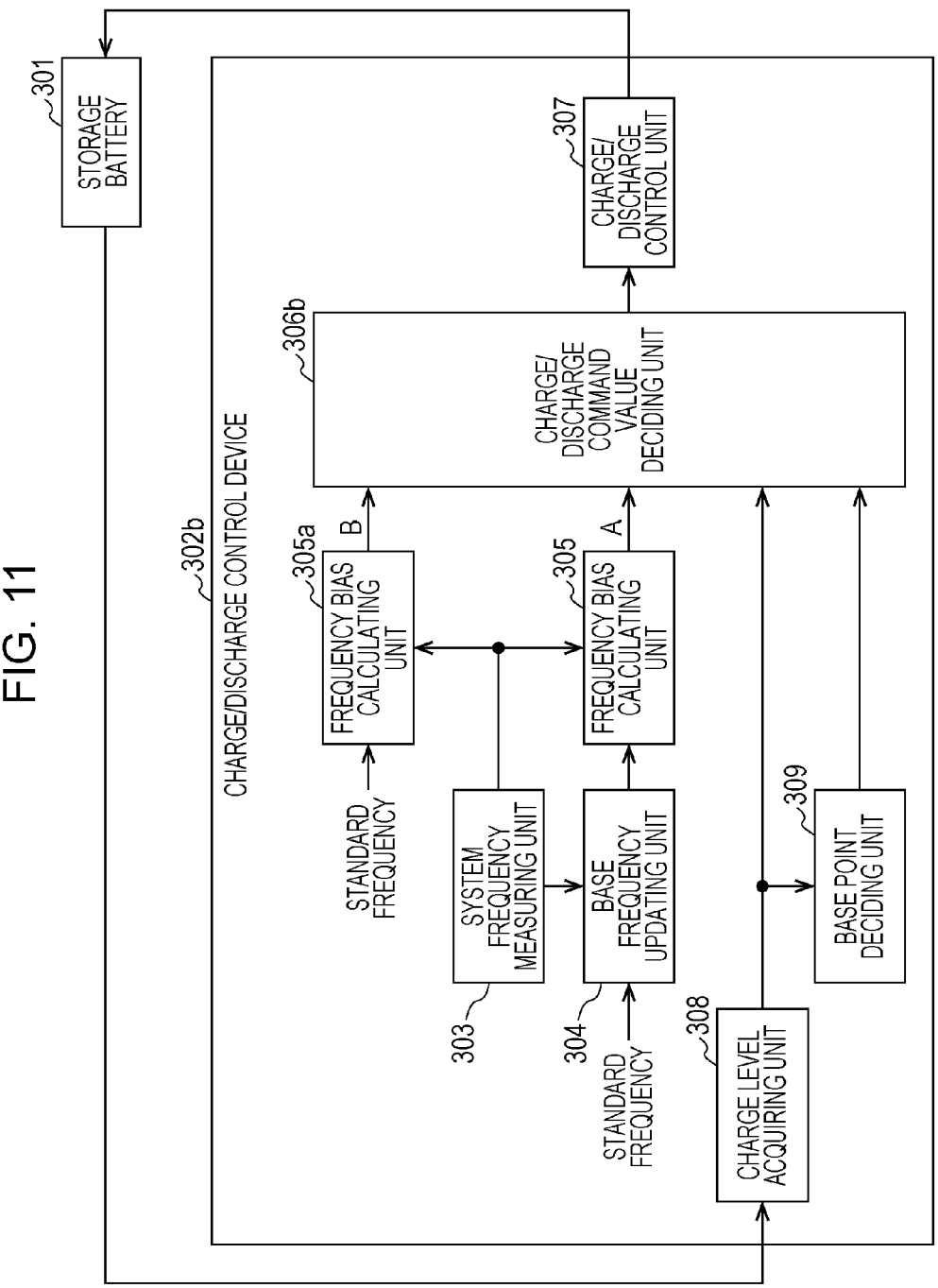
Figure 12:
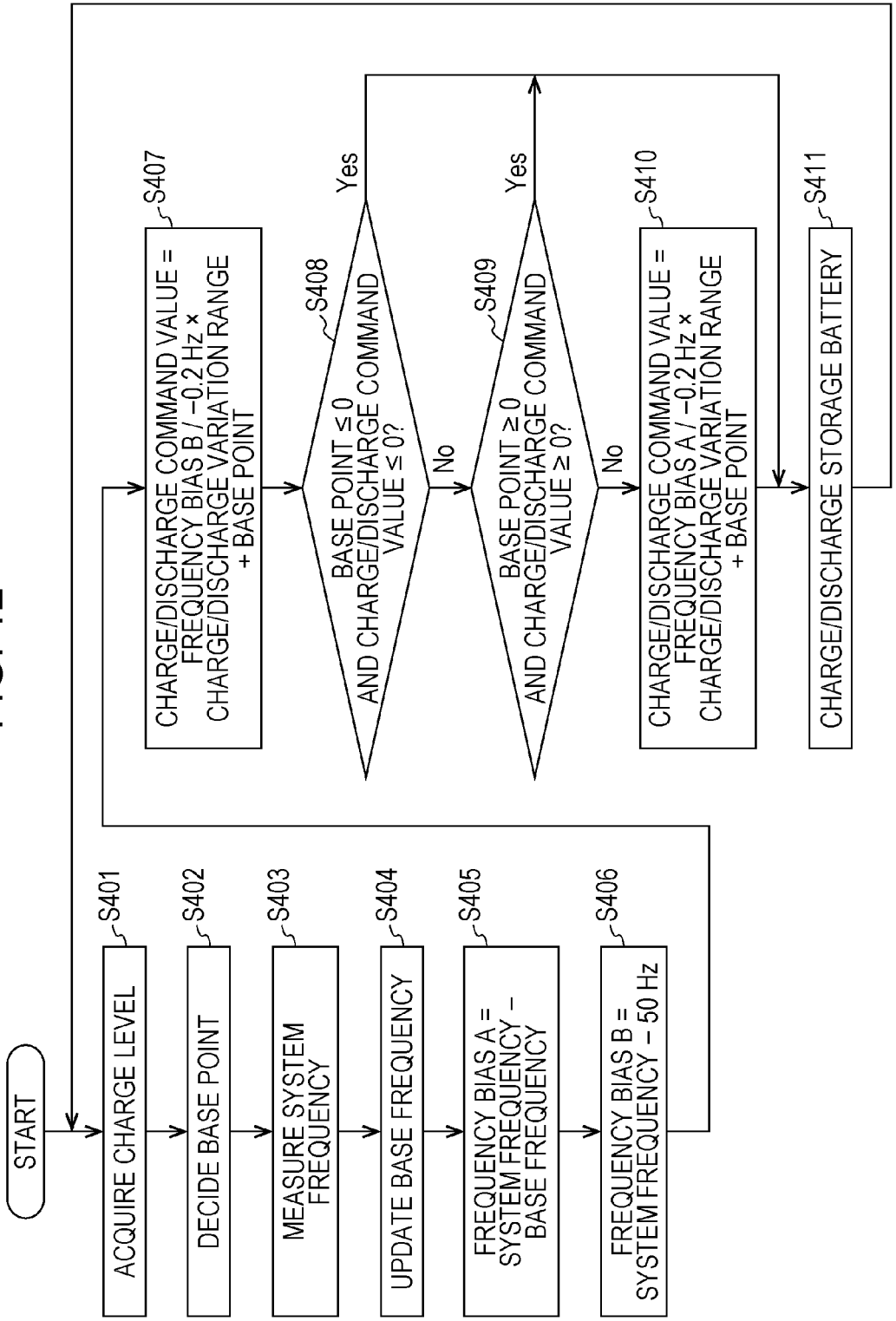
Figure 13:
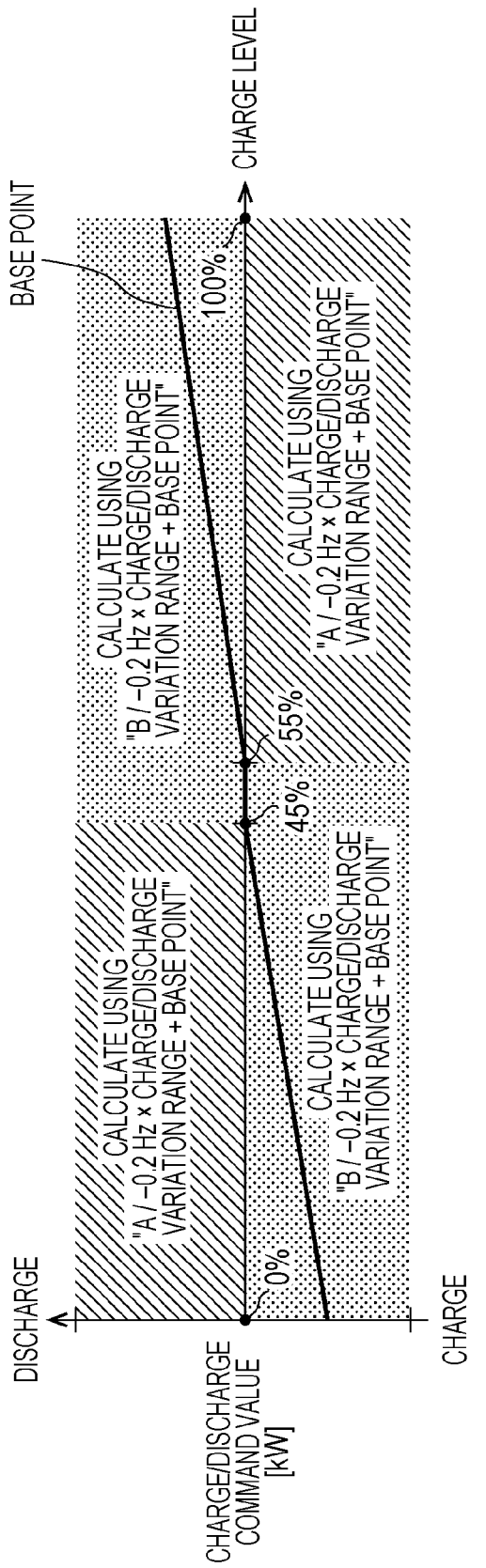
Figure 14:
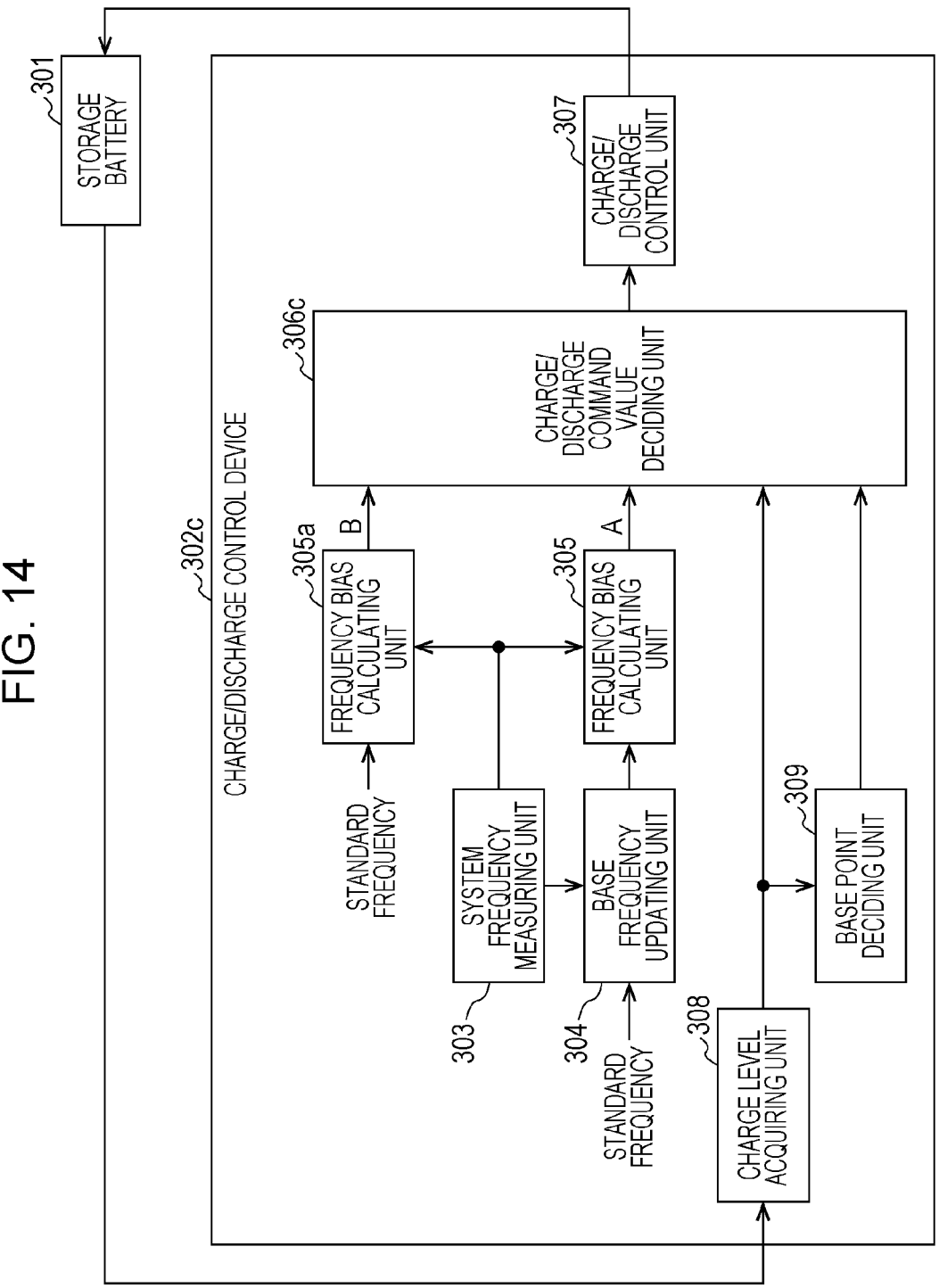
Figure 15:
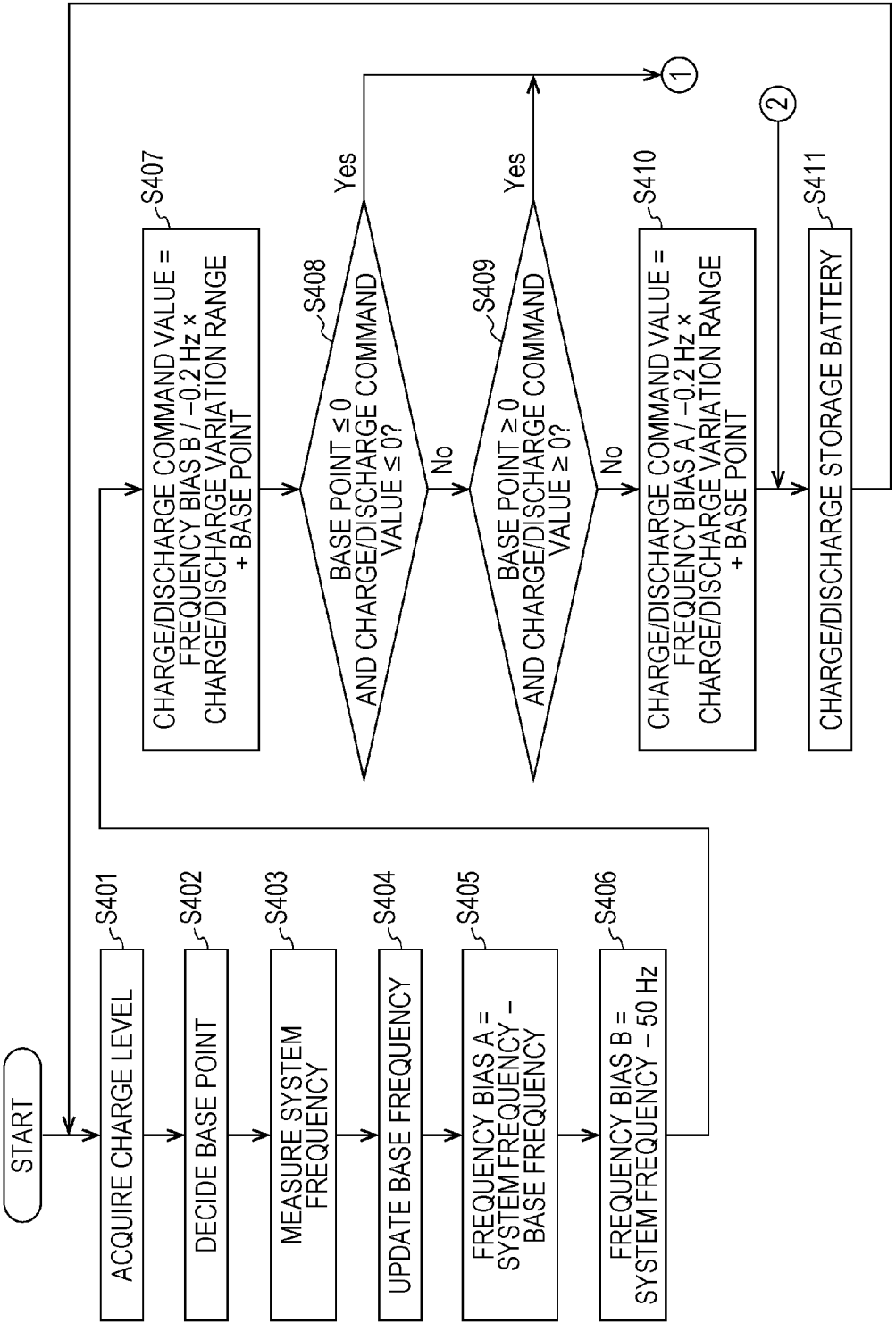
Figure 16:
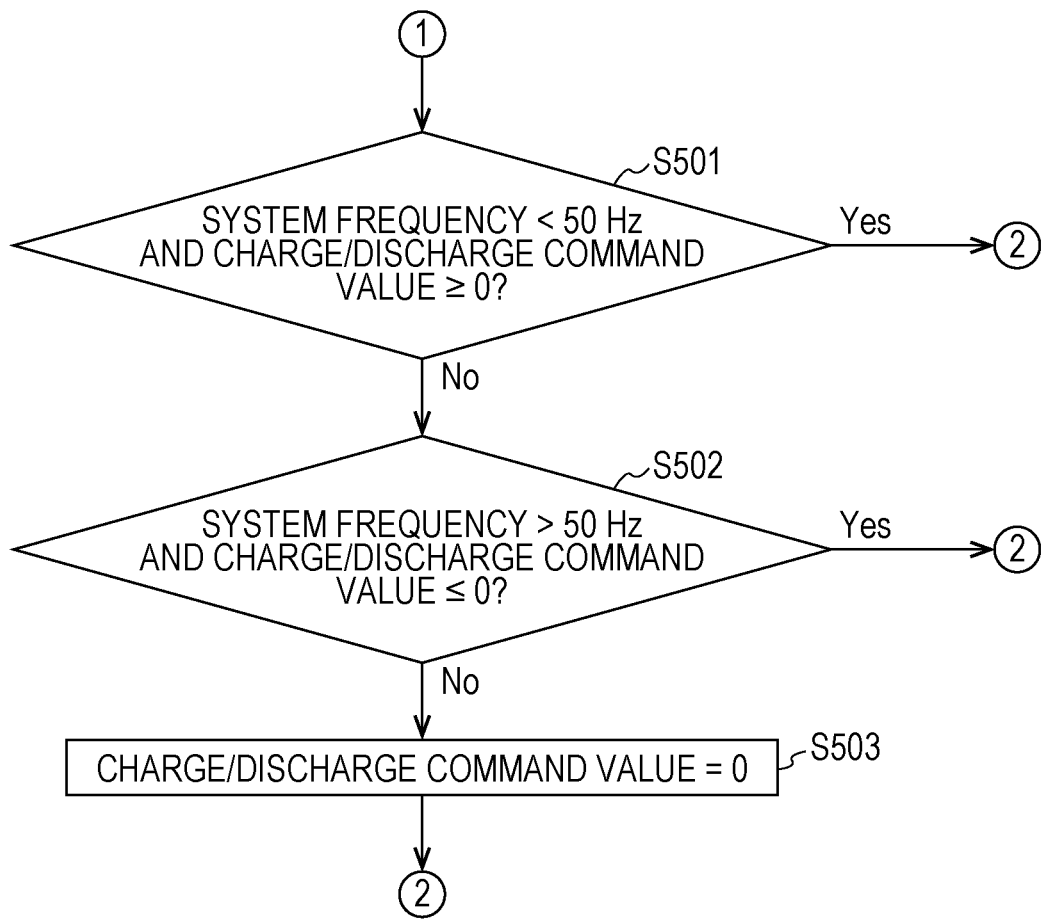
Figure 17:
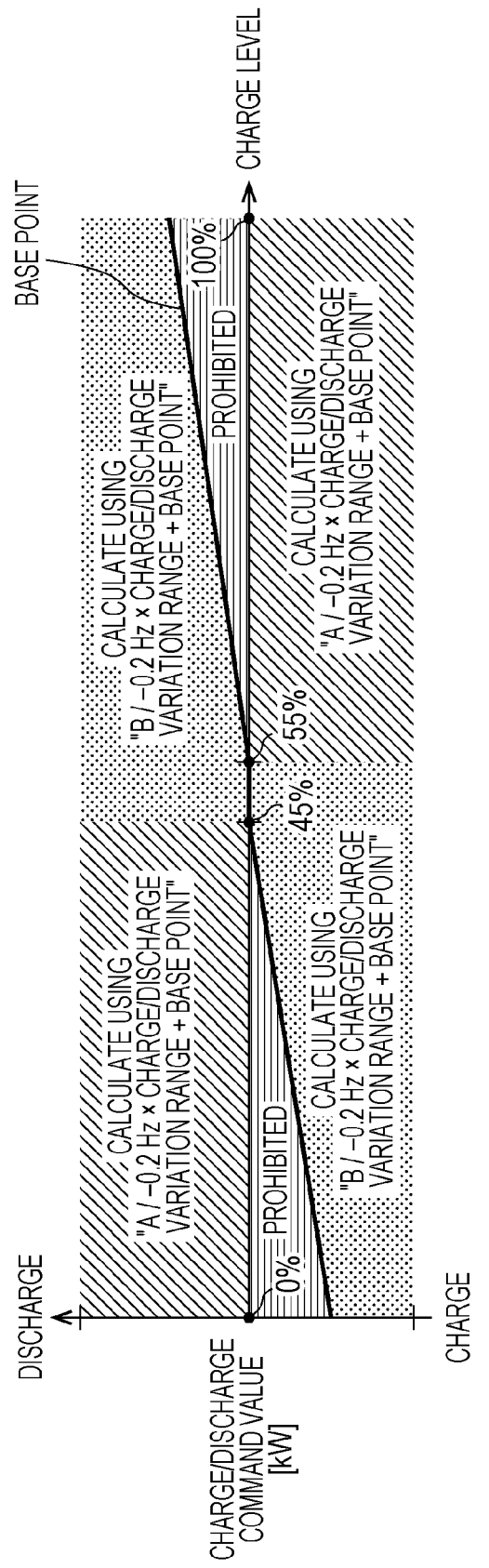
Figure 18:
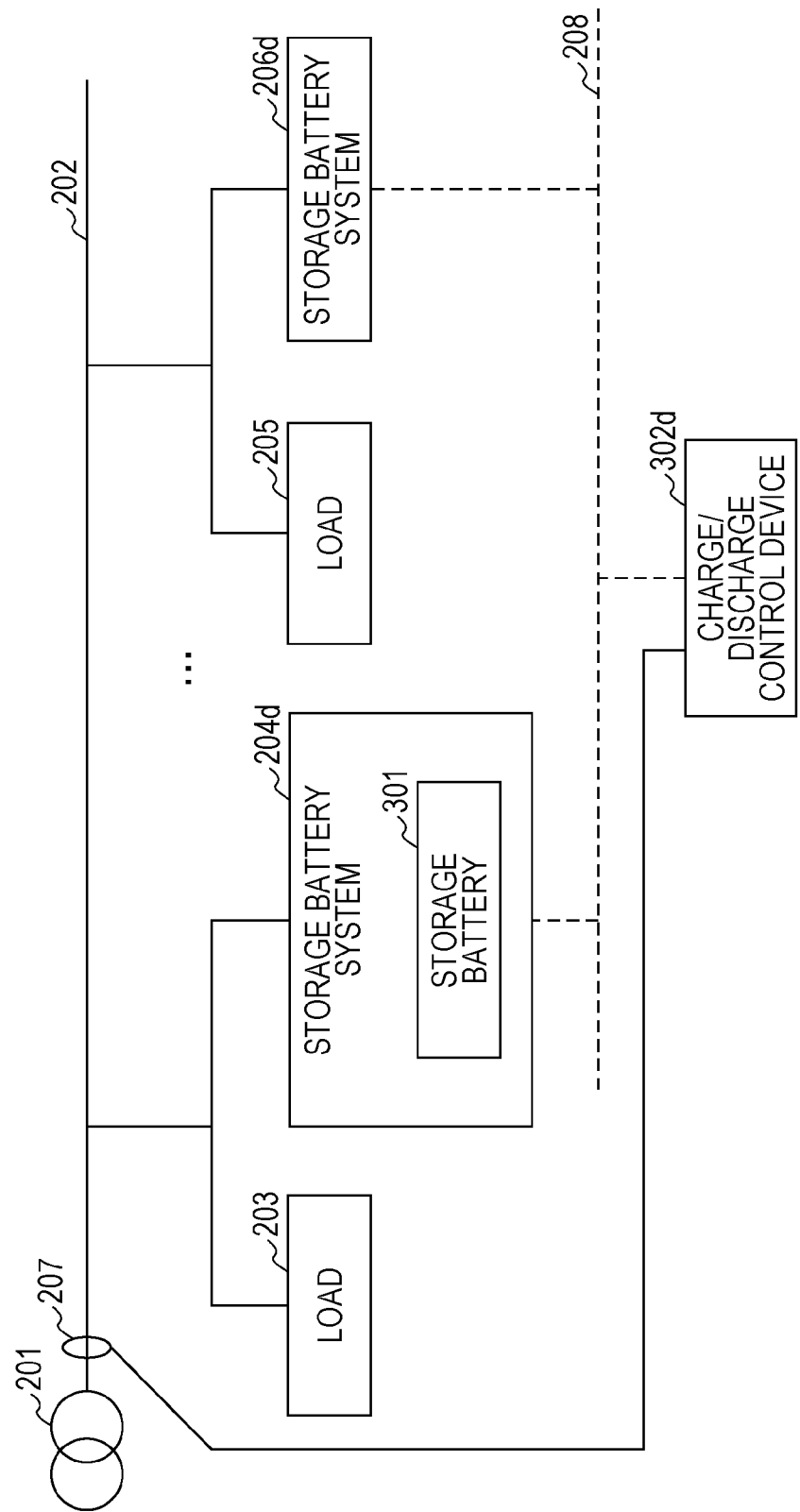
Figure 19:
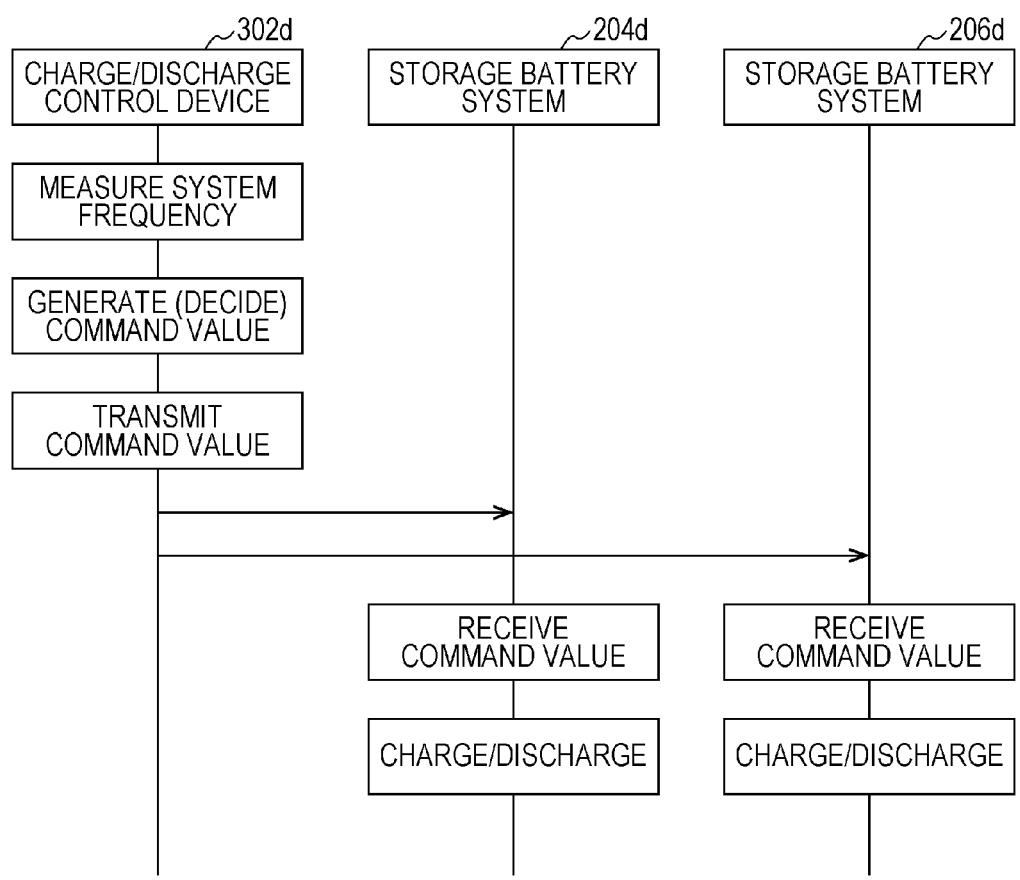

FIG. 1 is a diagram illustrating charge/discharge command values in a reference example;
FIG. 2 is a system configuration diagram illustrating a frequency regulation system according to Embodiment 1;
FIG. 3 is a block diagram of a charge/discharge control device according to Embodiment 1;
FIG. 4 is a flowchart illustrating operations of a charge/discharge control device according to Embodiment 1;
FIG. 5 is a flowchart illustrating operations of a base frequency update unit according to Embodiment 1;
FIG. 6 is a diagram illustrating variation of the base frequency according to Embodiment 1;
FIG. 7 is a diagram illustrating charge/discharge command values according to Embodiment 1;
FIG. 8 is a block diagram of a charge/discharge control device according to Embodiment 2;
FIG. 9 is a flowchart illustrating operations of a charge/discharge control device according to Embodiment 2;
FIG. 10 is a diagram illustrating charge/discharge command values according to Embodiment 2;
FIG. 11 is a block diagram of a charge/discharge control device according to Embodiment 3;
FIG. 12 is a flowchart illustrating operations of a charge/discharge control device according to Embodiment 3;
FIG. 13 is a diagram illustrating charge/discharge command values according to Embodiment 3;
FIG. 14 is a block diagram of a charge/discharge control device according to Embodiment 4;
FIG. 15 is a flowchart illustrating operations of a charge/discharge control device according to Embodiment 4;
FIG. 16 is a flowchart illustrating operations of a charge/discharge control device according to Embodiment 4;
FIG. 17 is a diagram illustrating charge/discharge command values according to Embodiment 4;
FIG. 18 is a system configuration diagram illustrating a frequency regulation system according to Embodiment 5;
FIG. 19 is a sequence diagram illustrating a process of a charge/discharge control device and a storage battery system according to Embodiment 5.

DESCRIPTION OF EMBODIMENTS (Underlying Knowledge Forming Basis of Aspect of the Present Disclosure)

The inventors discovered a problem related to technology that controls charging/discharging of a power storage system, as described in the Description of the Related Art. Details are described below.

The related art examines frequency regulation (FR) that regulates the frequency of a power system.

PTL 1 discloses technology that accommodates load variation using power-generating equipment and charge/discharge equipment. The load variation includes long-period variation and short-period variation. By increasing or decreasing the power supplied by the power-generating equipment, long-period variation having a large range of power variation may be accommodated. Meanwhile, by charging/discharging power, charge/discharge equipment of small capacity is able to accommodate short-period variation having a small range of power variation.

Also, PTL 1 discloses technology that tracks load variation by using a nickel-metal hydride battery or the like to compensate for load variation that could not be tracked by a gas engine generator. In PTL 1, a low-pass filter (LPF) is used to extract a long-period component of the load variation that should be tracked by the gas engine generator. By having the nickel-metal hydride battery track the component obtained by subtracting the above variation component via the above LPF from the original variation component, the nickel-metal hydride battery accommodates only the short-period variation component.

In this way, in some cases the generator is controlled to track only the long-term load variation, and the storage battery is controlled to track only the short-period load variation. As a result of FR being used in such technology, the frequency of the power system is regulated within an appropriate range that includes a standard frequency.

The standard frequency is a frequency that is predetermined for each power company. For example, in Japan, the two standard frequencies of 50 Hz and 60 Hz exist. The appropriate range that includes the standard frequency is ±0.2 Hz of the standard frequency, for example. The frequency of the power system (hereinafter, also called the system frequency) varies according to the supply and demand of power. Consequently, variation of the system frequency is minimized by FR.

Specifically, if demand is large but supply is small, the system frequency lowers. Conversely, if demand is small but supply is large, the system frequency rises. For example, a charge/discharge control device that conducts FR using a storage battery consumes the power of the power system by charging the storage battery if the system frequency is high. Also, the charge/discharge control device supplies power to the power system by discharging the storage battery if the system frequency is low. Consequently, the charge/discharge control device minimizes variation of the system frequency.

On the other hand, in some cases the charge/discharge control device controls charging/discharging of the storage battery to track only short-period variation of the system frequency. For example, provided another power-generating system operates to track long-period variation of the system frequency, the charge/discharge control device controls charging/discharging of the storage battery to track only short-period variation of the system frequency.

FIG. 1 is a diagram illustrating charge/discharge command values decided by a charge/discharge control device that controls charging/discharging of the storage battery to track only short-period variation of the system frequency. The charge/discharge control device uses a low-pass filter or the like to acquire a base frequency corresponding to the long-period variation component of the system frequency. Subsequently, the charge/discharge control device decides charge/discharge control values so that charging is conducted if the system frequency exceeds the base frequency, and discharging is conducted if the system frequency falls below the base frequency.

As a result, the charge/discharge control device controls charging and discharging so that the system frequency approaches the base frequency.

However, in some cases having the system frequency approach the base frequency causes the system frequency to move farther away from the standard frequency. Specifically, in the example of FIG. 1, the system frequency is below the standard frequency (50 Hz) at all times. For this reason, the storage battery should be discharged to make the system frequency approach the standard frequency. However, in the example of FIG. 1, charging is conducted in the time periods when the system frequency exceeds the base frequency.

Operations that discharge in time periods when the storage battery should be charged or charge in time periods when the storage battery should be discharged in this way are called reverse operations in the present disclosure. Since the system frequency moves farther away from the standard frequency as a result, such reverse operations are undesirable for the stabilization of the power system. For this reason, it is desirable to prevent the occurrence of reverse charge/discharge operations of the storage battery.

Accordingly, In one general aspect, the techniques disclosed here feature a charge/discharge control device includes: a frequency measurer that measures a system frequency of a power system per a predetermined control period; a base frequency updater that update a base frequency per the control period according to the system frequency; a first frequency deviation calculator that calculates a first frequency deviation per the control period, the first frequency deviation indicating a difference between the base frequency and the system frequency; a command value determiner that determines a first power command value that indicates a charge/discharge power to make the system frequency approach the base frequency according to the first frequency deviation; and a charge/discharge controller that causes a power storage system to charge/discharge power according to the first power command value. The base frequency updater determines whether or not reverse operation will occur in the power storage system according to the base frequency, the system frequency, and a standard frequency of the power system, the reverse operation being charging/discharging that corresponds to a direction that moves the system frequency farther away from the standard frequency, in a case of determining that the reverse operation will not occur, sets a frequency obtained by applying a low-pass filter to temporal variation of the system frequency to the base frequency, and in a case of determining that the reverse operation will occur, sets the system frequency to the base frequency.

Consequently, if it is determined that reverse operation will occur, the base frequency is updated to match the system frequency. In other words, if it is determined that reverse operation will occur, the charge/discharge control device does not cause the power storage system to charge/discharge. As a result, the charge/discharge control device is able to suppress the occurrence of reverse operation.

For example, the base frequency updater may also update the base frequency by varying the base frequency by a fixed value in each control period in which the base frequency updater determines that the reverse operation will not occur.

Consequently, the charge/discharge control device is able to reduce the computational complexity of computing the low-variation frequency compared to a moving average or the like.

As another example, if the system frequency is less than the standard frequency, the base frequency updater may update the base frequency by decreasing the base frequency by a fixed value in each control period in which the base frequency updater determines that the reverse operation will not occur.

Consequently, the charge/discharge control device is able to make the base frequency gradually approach a low system frequency.

As another example, if the system frequency is greater than the standard frequency, the base frequency updater may update the base frequency by increasing the base frequency by a fixed value in each control period in which the base frequency updater determines that the reverse operation will not occur.

Consequently, the charge/discharge control device is able to make the base frequency gradually approach a high system frequency.

As another example, the base frequency updater may determine that the reverse operation will not occur if the base frequency is included in an interval having the system frequency and the standard frequency as endpoints, and determine that the reverse operation will occur if the base frequency is not included in the interval.

Consequently, the charge/discharge control device is able to suitably determine whether or not reverse operation will occur, on the basis of whether or not the base frequency is included in a predetermined range.

As another example, the base frequency updater may determine that the reverse operation will not occur if the base frequency is less than or equal to the standard frequency and greater than the system frequency, or if the base frequency is equal to or greater than the standard frequency and less than the system frequency, and determine that the reverse operation will occur if the base frequency is greater than the standard frequency and equal to or greater than the system frequency, or if the base frequency is less than the standard frequency and less than or equal to the system frequency.

Consequently, the charge/discharge control device is able to suitably determine whether or not reverse operation will occur, on the basis of the relationship between the base frequency, the system frequency, and the standard frequency.

As another example, the charge/discharge control device may additionally include: a remaining capacity acquirer that acquires information related to a remaining charge of the power storage system; and a second frequency deviation calculator that calculates a second frequency deviation, the second frequency deviation indicating a difference between the standard frequency and the system frequency; wherein the command value decider uses the second frequency deviation to decide a second power command value that indicates a charge/discharge power to make the system frequency approach the standard frequency, and uses the information related to the remaining charge to select a power command value from a plurality of power command values including the first power command value and the second power command value, and the charge/discharge controller uses the selected power command value to cause the power storage system to charge/discharge power.

Consequently, the charge/discharge control device is able to control charging/discharging of the power storage system on the basis of the remaining capacity of the power storage system. For example, the charge/discharge control device is able to accommodate (respond to) larger variation on the basis of the remaining capacity.

As another example, the command value decider may select the second power command value as the power command value if (i) the remaining charge is less than or equal to a predetermined threshold value, and the second power command value does not indicate a discharge power, or if (ii) the remaining charge is equal to or greater than the predetermined threshold value, and the second power command value does not indicate a charge power, and select the first power command value as the power command value if (i) the remaining charge is greater than the predetermined threshold value, and the second power command value indicates a charge power, or if (ii) the remaining charge is less than the predetermined threshold value, and the second power command value indicates a discharge power.

Consequently, on the basis of the remaining capacity of the power storage system, the charge/discharge control device is able to suitably select one of either operation that makes the system frequency approach the base frequency, or operation that makes the system frequency approach the standard frequency.

As another example, the charge/discharge control device may additionally include: a remaining capacity acquirer that acquires information related to a remaining charge of the power storage system; a second frequency deviation calculator that calculates a second frequency deviation, the second frequency deviation indicating a difference between the standard frequency and the system frequency; and a base point decider that uses the information related to the remaining charge to decide a base point indicating a power charged/discharged by the power storage system when the system frequency matches the base frequency; wherein the command value decider uses the first frequency deviation and the base point to decide the first power command value, uses the second frequency deviation and the base point to decide a second power command value that indicates a charge/discharge power to make the system frequency approach the standard frequency, and uses the base point to select a power command value from a plurality of power command values including the first power command value and the second power command value, and the charge/discharge controller uses the selected power command value to cause the power storage system to charge/discharge power.

Consequently, the charge/discharge control device is able to control charging/discharging of the power storage system on the basis of the base point.

As another example, the base point decider may configure an offset to the base point if the remaining charge is less than a first threshold value or if the remaining charge is greater than a second threshold value, and the command value decider may use the base point configured with the offset to decide the power command value included in the plurality of power command values.

Consequently, in the charge/discharge control device, charging/discharging is suitably regulated on the basis of the base point.

As another example, the base point decider, by configuring an offset to the base point, may decrease a discharge amount corresponding to the power command value when the remaining charge is less than the first threshold value and the power command value indicates a discharge power, compared to the case of not configuring the offset to the base point, and increase a charge amount corresponding to the power command value when the remaining charge is less than the first threshold value and the power command value indicates a charge power, compared to the case of not configuring the offset to the base point.

Consequently, if the remaining capacity is small, charging/discharging is regulated on the basis of the base point so that the charge amount becomes larger and the discharge amount becomes smaller.

As another example, the base point decider, by configuring an offset to the base point, may increase a discharge amount corresponding to the power command value when the remaining charge is greater than the second threshold value and the power command value indicates a discharge power, compared to the case of not configuring the offset to the base point, and decrease a charge amount corresponding to the power command value when the remaining charge is greater than the second threshold value and the power command value indicates a charge power, compared to the case of not configuring the offset to the base point.

Consequently, if the remaining capacity is large, charging/discharging is regulated on the basis of the base point so that the charge amount becomes smaller and the discharge amount becomes larger.

As another example, the command value decider may select the second power command value as the power command value if (i) the base point does not indicate a discharge power, and the second power command value does not indicate a discharge power, or if (ii) the base point does not indicate a charge power, and the second power command value does not indicate a charge power, and select the first power command value as the power command value if (i) the base point indicates a discharge power, and the second power command value indicates a charge power, or if (ii) the base point indicates a charge power, and the second power command value indicates a discharge power.

Consequently, on the basis of the base point, the charge/discharge control device is able to suitably select one of either operation that makes the system frequency approach the base frequency, or operation that makes the system frequency approach the standard frequency.

As another example, if the power command value indicates a power of the reverse operation, the command value decider may select a value for which the power storage system does not charge/discharge as a new power command value instead of the relevant power command value, and the charge/discharge controller may cause the power storage system to stop charging/discharging in a control period in which a value for which the power storage system does not charge/discharge is selected as the new power command value.

Consequently, the charge/discharge control device is able to decide a charge/discharge command value so that reverse operation is not conducted.

As another example, the command value decider may select a value for which the power storage system does not charge/discharge as the power command value if (i) the base point does not indicate a discharge power, the second power command value indicates a charge power, and the system frequency is less than or equal to the standard frequency, or if (ii) the base point does not indicate a charge power, the second power command value indicates a discharge power, and the system frequency is equal to or greater than the standard frequency, and the charge/discharge controller may cause the power storage system to stop charging/discharging in a control period in which a value for which the power storage system does not charge/discharge is selected as the power command value.

As a result, the charge/discharge control device is able to suitably suppress the occurrence of reverse operation based on the application of the base point.

Furthermore, these general or specific aspects may also be realized by a system, method, integrated circuit, computer program, or non-transitory computer-readable recording medium such as a CD-ROM disc, and may also be realized by an arbitrary combination of a system, method, integrated circuit, computer program, and recording medium.

Hereinafter, exemplary embodiments will be described specifically with reference to the drawings. Note that the exemplary embodiments described hereinafter all illustrate general or specific examples. Features such as numerical values, shapes, materials, structural elements, layout positions and connection states of structural elements, steps, and the ordering of steps indicated in the following exemplary embodiments are merely examples, and are not intended to limit the present disclosure. In addition, among the structural elements in the following exemplary embodiments, structural elements that are not described in the independent claim indicating the broadest concept are described as arbitrary or optional structural elements.

In addition, the charge/discharge control device indicated in the following embodiments may also be referred to as a frequency control device.

Also, charging/discharging corresponds to at least one of charging and discharging. Also, for the value indicating the charge/discharge power herein, in some cases a negative value indicates a charge power, while a positive value indicates a discharge power. The positive/negative relationship may also be reversed. Also, in some cases, a value indicating a charge/discharge power is a value (0) corresponding to a state in which neither charging nor discharging are conducted. Also, in some cases, the magnitude of charge/discharge power means the absolute value of the value indicating the charge/discharge power, irrespective of charging or discharging. Also, in some cases, power means the value (magnitude) thereof.

Embodiment 1

The charge/discharge control device according to Embodiment 1 updates a target base frequency that the system frequency approaches, on the basis of the measured system frequency and the standard frequency of the power system.

FIG. 2 is a system configuration diagram of a frequency control system including the charge/discharge control device according to Embodiment 1. FIG. 2 illustrates a distribution transformer 201, a distribution line 202, loads 203 and 205, and storage battery systems 204 and 206.

The distribution transformer 201 is connected to a power system provided by a system operator, and is a transformer that converts power supplied from the power system into a suitable voltage to supply to the loads 203 and 205. The system operator is a business that operates the power system.

The distribution line 202 electrically connects the distribution transformer 201 to the loads 203 and 205, and is a power line for supplying power supplied by the distribution transformer 201 to the loads 203 and 205.

The loads 203 and 205 are pieces of equipment that consume power supplied from the power system. The loads 203 and 205 may be home appliances, for example.

The storage battery systems 204 and 206 conduct charging with power supplied from the power system, or discharge power to supply to the power system. By conducting charging or discharging as above, the storage battery systems 204 and 206 cause the frequency of the power supplied from the power system to approach the base frequency. As in FIG. 2, the storage battery system 204 is equipped with a storage battery 301 and a charge/discharge control device 302. The storage battery system 206 may be equipped with structural elements similar to the storage battery system 204.

The storage battery 301 conducts charging or discharging under control by the charge/discharge control device 302. Herein, the storage battery 301 is a power storage device that includes a DC/AC inverter (not illustrated).

The charge/discharge control device 302 causes the storage battery 301 to execute charging/discharging. Additionally, the charge/discharge control device 302 conducts frequency regulation to make the system frequency approach the base frequency. The system frequency is the frequency of the power system, and specifically, is the frequency of AC power in the power system. More specifically, the system frequency is the frequency of the oscillations of the voltage supplied from the power system.

For example, the charge/discharge control device 302 measures the system frequency by measuring the frequency of the power supplied from the power system. Subsequently, the charge/discharge control device 302 controls charging/discharging of the storage battery 301 on the basis of the measured system frequency to make the system frequency approach the base frequency.

Note that the distribution transformer 201 and the distribution line 202 may also be included in the power system. Also, more loads and storage battery systems may be connected to the distribution line 202.

FIG. 3 is a block diagram of the charge/discharge control device 302 illustrated in FIG. 2. The charge/discharge control device 302 is equipped with a system frequency measuring unit 303, a base frequency updating unit 304, a frequency deviation calculating unit 305, a charge/discharge command value deciding unit 306, and a charge/discharge control unit 307.

The system frequency measuring unit 303 is a frequency measuring unit that measures the system frequency. The system frequency measuring unit 303 may also measure the system frequency via a sensor for measuring the system frequency.

The base frequency updating unit 304 updates the base frequency. Specifically, the base frequency updating unit 304 acquires the system frequency measured by the system frequency measuring unit 303, and updates a predetermined base frequency on the basis of the measured system frequency.

For example, if the base frequency is farther away from the standard frequency than the system frequency, the base frequency updating unit 304 updates the base frequency so that the base frequency matches the system frequency. If the system frequency is farther away from the standard frequency than the base frequency, the base frequency updating unit 304 updates the base frequency so that the base frequency approaches the system frequency with a predetermined variation range.

The frequency deviation calculating unit 305 calculates the frequency deviation. The frequency deviation indicates the difference between the system frequency and the base frequency. Specifically, the frequency deviation calculating unit 305 acquires the system frequency measured by the system frequency measuring unit 303 and the base frequency updated by the base frequency updating unit 304, and calculates the frequency deviation on the basis of the measured system frequency and the updated base frequency.

The charge/discharge command value deciding unit 306 is a command value deciding unit that decides a charge/discharge command value by calculating a charge/discharge command value. The charge/discharge command value indicates the power that the storage battery 301 is made to charge/discharge. In some cases, the charge/discharge command value is referred to as the power value or the power command value.

For example, the charge/discharge command value deciding unit 306 acquires the frequency deviation calculated by the frequency deviation calculating unit 305, and on the basis of the calculated frequency deviation, calculates a power value indicating the power for making the system frequency approach the base frequency. Subsequently, the charge/discharge command value deciding unit 306 decides the calculated power value as the charge/discharge command value.

Herein, a negative charge/discharge command value corresponds to charging. A positive charge/discharge command value corresponds to discharging. The relationship between positive and negative indicated herein is merely one example, and may also be reversed.

The charge/discharge control unit 307 controls charging/discharging of the storage battery 301. In other words, the charge/discharge control unit 307 causes the storage battery 301 to execute charging/discharging. Specifically, the charge/discharge control unit 307 acquires the charge/discharge command value decided by the charge/discharge command value deciding unit 306, and controls charging/discharging of the storage battery 301 on the basis of the decided charge/discharge command value. For example, the charge/discharge control unit 307 causes the storage battery 301 to execute charging/discharging by transmitting the charge/discharge command value to the storage battery 301.

The storage battery 301 executes charging/discharging. Specifically, the storage battery 301 receives the charge/discharge command value from the charge/discharge control unit 307, and on the basis of the charge/discharge command value, executes charging/discharging by causing the inverter in the storage battery 301 to operate.

FIG. 4 is a flowchart illustrating operation of the charge/discharge control device 302 illustrated in FIG. 3.

First, the system frequency measuring unit 303 measures the system frequency (S101).

Next, the base frequency updating unit 304 updates the base frequency on the basis of the measured system frequency (S102). The base frequency updating unit 304 determines whether or not reverse operation will occur, on the basis of the base frequency, the system frequency, and the standard frequency. In the case of determining that reverse operation will not occur, the base frequency updating unit 304 matches the base frequency to a low-variation frequency. The low-variation frequency is a frequency obtained by applying a low-pass filter to the temporal variation of the system frequency. On the other hand, in the case of determining that reverse operation will occur, the base frequency updating unit 304 matches the base frequency to the system frequency.

For example, if the base frequency is included in an interval (frequency range) having the system frequency and the base frequency as endpoints, the base frequency updating unit 304 determines that reverse operation will not occur. Conversely, if the base frequency is not included in an interval (frequency range) having the system frequency and the base frequency as endpoints, the base frequency updating unit 304 determines that reverse operation will occur. Operation of the base frequency updating unit 304 will be later discussed more specifically.

Next, the frequency deviation calculating unit 305 calculates the frequency deviation indicating the difference between the updated base frequency and the measured system frequency (S103). The frequency deviation calculating unit 305 calculates the frequency deviation on the basis of the following Eq. 1.

$$\text{Frequency deviation} = \text{system frequency} - \text{base frequency} \quad \text{(Eq. 1)}$$

Next, the charge/discharge command value deciding unit 306 decides a charge/discharge command value indicating a charge/discharge power to make the system frequency approach the base frequency, on the basis of the frequency deviation (S104). The charge/discharge command value deciding unit 306 calculates the charge/discharge command value on the basis of the following Eq. 2.

Charge/discharge command value=frequency deviation/−(appropriate frequency range)×charge/discharge variation range    (Eq. 2)

In Eq. 2, the appropriate frequency range corresponds to the appropriate range of the system frequency. For example, if the standard frequency is 50 Hz, and the appropriate range of the system frequency is from 49.8 Hz to 50.2 Hz, the appropriate frequency range is 0.2 Hz. If the appropriate frequency range is 0.2 Hz, the charge/discharge command value deciding unit 306 calculates the charge/discharge command value on the basis of the following Eq. 3.

Charge/discharge command value=frequency deviation/−0.2 Hz×charge/discharge variation range    (Eq. 3)

The charge/discharge variation range corresponds to the maximum value of the charge/discharge power of the storage battery 301. The maximum value of the charge/discharge power of the storage battery 301 depends on the capacity of the inverter in the storage battery 301.

Next, the charge/discharge control unit 307 causes the storage battery 301 to execute charging/discharging that corresponds to the power indicated by the charge/discharge command value (S105).

For example, if the updated base frequency is 50.1 Hz and the measured system frequency is 50.2 Hz, the frequency deviation is 0.1 Hz. Additionally, if the appropriate frequency range is 0.2 Hz and the charge/discharge variation range is 20 kW, the charge/discharge command value is 0.1 Hz/−0.2 Hz×20 kW=−10 kW. In this cases, the charge/discharge control unit 307 causes the storage battery 301 to execute charging/discharging that corresponds to −10 kW. In other words, the charge/discharge control unit 307 causes the storage battery 301 to charge 10 kW of power.

The charge/discharge control device 302 repeats the above operation every predetermined control period. The predetermined control period is a period such as 1 s or 4 s, for example.

Next, operation of the base frequency updating unit 304 will be illustrated more specifically.

FIG. 5 is a flowchart illustrating operation of the base frequency updating unit 304 illustrated in FIG. 3. The operation illustrated in FIG. 5 primarily corresponds to the operation of updating the base frequency (S102) illustrated in FIG. 4.

First, the base frequency updating unit 304 initializes the base frequency by setting the base frequency to the standard frequency (S201). In Embodiment 1, the base frequency is set to 50 Hz.

Next, the base frequency updating unit 304 acquires the system frequency measured by the system frequency measuring unit 303 (S202).

Next, the base frequency updating unit 304 determines whether or not the base frequency is greater than the system frequency and less than or equal to the standard frequency (50 Hz) (S203). If the base frequency is greater than the system frequency and less than or equal to the standard frequency (S203, Yes), the base frequency updating unit 304 determines that reverse operation will not occur. In this case, the base frequency updating unit 304 gradually decreases the base frequency. For example, the base frequency updating unit 304 decreases the base frequency at a rate of 0.02 Hz/min (S204).

Next, the base frequency updating unit 304 determines whether or not the base frequency is less than the system frequency and equal to or greater than the standard frequency (50 Hz) (S205). If the base frequency is less than the system frequency and equal to or greater than the standard frequency (S205, Yes), the base frequency updating unit 304 determines that reverse operation will not occur. In this case, the base frequency updating unit 304 gradually increases the base frequency. For example, the base frequency updating unit 304 increases the base frequency at a rate of 0.02 Hz/min (S206).

Subsequently, if the base frequency does not satisfy the above conditions (No in S203 and No in S205), the base frequency updating unit 304 determines that reverse operation will occur. In this case, the base frequency updating unit 304 matches the base frequency to the system frequency (S207).

The base frequency updating unit 304 repeats the series of operations from acquiring the system frequency to updating the base frequency every predetermined control period.

FIG. 6 is a diagram illustrating variation of the base frequency according to Embodiment 1. For example, if the base frequency is greater than the system frequency and less than or equal to the standard frequency, the base frequency updating unit 304 gradually lowers the base frequency (the period of t<t+2). As a result, the base frequency updating unit 304 matches the base frequency to the low-variation frequency. On the other hand, if the pre-update (pre-change) base frequency is less than or equal to the newly measured system frequency and also less than the standard frequency, the base frequency updating unit 304 matches the base frequency to the system frequency (the period of t≥t+2).

FIG. 7 is a diagram illustrating charge/discharge command values according to Embodiment 1. FIG. 7 illustrates the base frequency updated on the basis of the above operation. The system frequency and the standard frequency are the same as the example of FIG. 1. The base frequency is equal to or greater than the system frequency over all time periods illustrated in FIG. 7. Consequently, in all time periods, the charge/discharge command value is a value indicating discharge, or a value for which charging/discharging is not executed. In addition, charging that would move the system frequency farther away from the standard frequency is not executed. Consequently, the occurrence of reverse operation is suppressed.

As described above, the charge/discharge control device 302 according to Embodiment 1 updates the base frequency so that the base frequency matches the system frequency in the case of determining that reverse charge/discharge operation will not occur. In other words, in the case of determining that reverse charge/discharge operation will occur, the charge/discharge control device 302 does not cause the storage battery 301 to execute charging/discharging. As a result, the charge/discharge control device 302 is able to suppress the occurrence of reverse operation.

Note that in the present embodiment, the base frequency updating unit 304 determines whether or not reverse operation will occur on the basis of the pre-update base frequency. However, the base frequency updating unit 304 may also determine whether or not reverse operation will occur on the basis of the post-update base frequency. Subsequently, if it is determined that reverse operation will occur, the base frequency updating unit 304 may further update the updated base frequency so that the base frequency matches the system frequency.

In addition, the base frequency updating unit 304 may also update the base frequency so that the base frequency matches the low-variation frequency irrespective of whether or not reverse operation will occur. In addition, the charge/discharge command value deciding unit 306 may also determine whether or not reverse operation will occur on the basis of the updated base frequency. Additionally, in the case of determining the reverse operation will occur, the charge/discharge command value deciding unit 306 may decide a value for which charging/discharging is not executed as the charge/discharge command value. Consequently, the occurrence of reverse operation is suppressed. In this case, the low-variation frequency may also be a moving average of the system frequency.

Embodiment 2

The charge/discharge control device according to Embodiment 2 decides (selects) the charge/discharge command value on the basis of the remaining capacity of the storage battery. Note that the remaining capacity is also referred to as the remaining charge. Likewise, the remaining capacity acquisition unit and the remaining capacity information described hereinafter similarly may be referred to as the remaining charge acquisition unit and the remaining charge information.

FIG. 8 is a block diagram of a charge/discharge control device according to Embodiment 2. Compared to the charge/discharge control device 302 illustrated in FIG. 3, the charge/discharge control device 302a illustrated in FIG. 8 is additionally equipped with a frequency deviation calculating unit 305a and a remaining capacity acquiring unit 308. Also, the charge/discharge control device 302a is equipped with a charge/discharge command value deciding unit 306a instead of the charge/discharge command value deciding unit 306. Other structural elements are similar to the structural elements illustrated in FIG. 3.

The remaining capacity acquiring unit 308 acquires remaining capacity information of the storage battery 301. The remaining capacity information of the storage battery 301 is information related to the remaining capacity of the storage battery 301, and specifically, indicates the remaining capacity of the storage battery 301. As discussed above, the remaining capacity is also referred to as the remaining charge, and is also called the state of charge (SOC) or the battery level. The remaining capacity of the storage battery 301 is the remaining amount of power charged in the storage battery 301. The remaining capacity may be expressed as a ratio versus the total capacity of the storage battery 301, or expressed as a ratio versus a partial capacity of the storage battery 301.

For example, it is also possible to use only part of the total capacity of the storage battery 301 for frequency regulation. In this case, the remaining capacity acquiring unit 308 acquires the remaining capacity for frequency regulation rather than the overall remaining capacity of the storage battery 301.

Specifically, it is possible to use a range corresponding to the capacity from 20% to 80% of the total capacity of the storage battery 301 for frequency regulation. In this case, the remaining capacity from 20% to 80% of the total capacity of the storage battery 301 corresponds to the remaining capacity from 0% to 100% for frequency regulation. If the remaining capacity versus the total capacity of the storage battery 301 is 20%, the remaining capacity for frequency regulation is 0%. If the remaining capacity versus the total capacity of the storage battery 301 is 80%, the remaining capacity for frequency regulation is 100%.

The remaining capacity acquiring unit 308 may also calculate the remaining capacity for frequency regulation on the basis of the following Eq. 4.

Remaining capacity for frequency regulation=100× (remaining capacity versus total capacity−lower bound)/(upper bound−lower bound)    (Eq. 4)

The upper bound and lower bound in Eq. 4 indicate the upper bound and the lower bound of the range of the total capacity that corresponds to the remaining capacity from 0% to 100% for frequency regulation. In Eq. 4, the remaining capacity for frequency regulation may be determined to be 0% if the remaining capacity for frequency regulation falls below 0%. Also, in Eq. 4, the remaining capacity for frequency regulation may be determined to be 100% if the remaining capacity for frequency regulation exceeds 100%.

The frequency deviation calculating unit 305a calculates the frequency deviation indicating the difference between the standard frequency and the system frequency. Specifically, the frequency deviation calculating unit 305a calculates the frequency deviation by acquiring the system frequency measured by the system frequency measuring unit 303, and calculating the difference between the measured system frequency and the predetermined standard frequency.

Hereinafter, the frequency deviation that indicates the difference between the system frequency and the base frequency may be referred to as the frequency deviation A, or simply A in some cases. The frequency deviation that indicates the difference between the system frequency and the standard frequency may be referred to as the frequency deviation B, or simply B in some cases. The frequency deviation calculating unit 305 calculates the frequency deviation A, whereas the frequency deviation calculating unit 305a calculates the frequency deviation B.

The charge/discharge command value deciding unit 306a decides (selects) the charge/discharge command value. Specifically, the charge/discharge command value deciding unit 306a acquires the remaining capacity acquired by the remaining capacity acquiring unit 308, the frequency deviation A calculated by the frequency deviation calculating unit 305, and the frequency deviation B calculated by the frequency deviation calculating unit 305a. Subsequently, the charge/discharge command value deciding unit 306a decides the charge/discharge command value on the basis of the acquired remaining capacity, the calculated frequency deviation A, and the calculated frequency deviation B.

For example, the charge/discharge command value deciding unit 306a calculates a power value indicating a charge/discharge power to make the system frequency approach the standard frequency, on the basis of the frequency deviation B. If the calculated charge/discharge command value is less than or equal to 0 and the remaining capacity is less than or equal to 50%, the charge/discharge command value deciding unit 306a decides the calculated power value as the charge/discharge command value. Also, if the calculated charge/discharge command value is equal to or greater than 0 and the remaining capacity is equal to or greater than 50%, the charge/discharge command value deciding unit 306a decides the calculated power value as the charge/discharge command value.

Otherwise, the charge/discharge command value deciding unit 306a calculates a power value indicating a charge/discharge power to make the system frequency approach the base frequency, on the basis of the frequency deviation A. Subsequently, the charge/discharge command value deciding unit 306a decides the calculated power value as the charge/discharge command value.

FIG. 9 is a flowchart illustrating operation of the charge/discharge control device 302a illustrated in FIG. 8.

First, the remaining capacity acquiring unit 308 acquires the remaining capacity of the storage battery 301 (S301). For example, the remaining capacity acquiring unit 308 acquires the remaining capacity of the storage battery 301 by receiving information indicating the remaining capacity of the storage battery 301 from the storage battery 301 via communication.

Next, the system frequency measuring unit 303 measures the system frequency (S302). Next, the base frequency updating unit 304 updates the base frequency on the basis of the measured system frequency (S303). These operations are similar to Embodiment 1.

Next, the frequency deviation calculating unit 305 calculates the frequency deviation A indicating the difference between the updated base frequency and the measured system frequency (S304). More specifically, the frequency deviation calculating unit 305 calculates the frequency deviation A on the basis of the following Eq. 5.

$$\text{Frequency deviation } A = \text{system frequency} - \text{base frequency} \quad \text{(Eq. 5)}$$

Next, the frequency deviation calculating unit 305a calculates the frequency deviation B indicating the difference between the standard frequency of the power system and the measured system frequency (S305). More specifically, the frequency deviation calculating unit 305a calculates the frequency deviation B on the basis of the following Eq. 6.

$$\text{Frequency deviation } B = \text{system frequency} - \text{standard frequency} \quad \text{(Eq. 6)}$$

Herein, since the standard frequency is 50 Hz, Eq. 6 may be substituted with Eq. 7.

$$\text{Frequency deviation } B = \text{system frequency} - 50 \text{ Hz} \quad \text{(Eq. 7)}$$

Next, the charge/discharge command value deciding unit 306a decides a charge/discharge command value (power value) indicating a charge/discharge power to make the system frequency approach the standard frequency, on the basis of the frequency deviation B (S306). More specifically, the charge/discharge command value deciding unit 306a calculates the charge/discharge command value on the basis of the following Eq. 8.

$$\text{Charge/discharge command value} = \text{frequency deviation } B / -(\text{appropriate frequency range}) \times \text{charge/discharge variation range} \quad \text{(Eq. 8)}$$

The charge/discharge variation range and the appropriate frequency range in Eq. 8 are similar to Eq. 2. If the appropriate frequency range is 0.2 Hz, the charge/discharge command value deciding unit 306a calculates the charge/discharge command value on the basis of the following Eq. 9.

$$\text{Charge/discharge command value} = \text{frequency deviation } B / -0.2 \text{ Hz} \times \text{charge/discharge variation range} \quad \text{(Eq. 9)}$$

The charge/discharge command value deciding unit 306a may also modify the charge/discharge variation range on the basis of the remaining capacity. For example, if the remaining capacity is near 0% or 100%, sufficient charging/discharging is difficult. Consequently, the charge/discharge command value deciding unit 306a may modify the charge/discharge variation range so that the charge/discharge variation range becomes larger as the remaining capacity approaches 50%, and the charge/discharge variation range becomes smaller as the remaining capacity approaches 0% or 100%.

Next, the charge/discharge command value deciding unit 306a determines whether or not the calculated charge/discharge command value is less than or equal to 0 and the remaining capacity is less than or equal to 50% (S307). Additionally, the charge/discharge command value deciding unit 306a determines whether or not the calculated charge/discharge command value is equal to or greater than 0 and the remaining capacity is equal to or greater than 50% (S308). Although 50% is used as a threshold value herein, the threshold value is not limited to 50%. Also, two mutually different threshold values may be used for these two determinations (S307, S308).

If the calculated charge/discharge command value is less than or equal to 0 and the remaining capacity is less than or equal to 50% (S307, Yes), or if the calculated charge/discharge command value is equal to or greater than 0 and the remaining capacity is equal to or greater than 50% (S308, Yes), the charge/discharge command value deciding unit 306a decides the calculated charge/discharge command value as the final charge/discharge command value.

Otherwise (No in S307 and No in S308), the charge/discharge command value deciding unit 306a decides a charge/discharge command value (power value) indicating a charge/discharge power to make the system frequency approach the base frequency, on the basis of the frequency deviation A (S309). More specifically, the charge/discharge command value deciding unit 306a calculates the charge/discharge command value on the basis of the following Eq. 10.

$$\text{Charge/discharge command value} = \text{frequency deviation } A / -(\text{appropriate frequency range}) \times \text{charge/discharge variation range} \quad \text{(Eq. 10)}$$

In other words, the frequency deviation A is used instead of the frequency deviation B to calculate the charge/discharge command value. If the appropriate frequency range is 0.2 Hz, the charge/discharge command value deciding unit 306a calculates the charge/discharge command value on the basis of the following Eq. 11.

$$\text{Charge/discharge command value} = \text{frequency deviation } A / -0.2 \text{ Hz} \times \text{charge/discharge variation range} \quad \text{(Eq. 11)}$$

Subsequently, the charge/discharge command value deciding unit 306a decides the charge/discharge command value calculated on the basis of the frequency deviation A as the final charge/discharge command value.

Next, the charge/discharge control unit 307 causes the storage battery 301 to execute charging/discharging that corresponds to the power indicated by the final decided charge/discharge command value (S310).

FIG. 10 is a diagram illustrating charge/discharge command values decided according to the operation illustrated in FIG. 9. To discharge in the state in which the remaining capacity is smaller than 50%, a charge/discharge command value based on the frequency deviation A is applied. To charge in the state in which the remaining capacity is smaller than 50%, a charge/discharge command value based on the frequency deviation B is applied. To discharge in the state in which the remaining capacity is larger than 50%, a charge/discharge command value based on the frequency deviation B is applied. To charge in the state in which the remaining capacity is larger than 50%, a charge/discharge command value based on the frequency deviation A is applied.

The base frequency is updated to track the system frequency. Consequently, the absolute value of the frequency deviation A that indicates the difference between the system frequency and the base frequency is expected to be less than the absolute value of the frequency deviation B that indicates the difference between the system frequency and the standard frequency. Conversely, the absolute value of the frequency deviation B is expected to be greater than the absolute value of the frequency deviation A. Consequently, the absolute value of a charge/discharge command value based on the frequency deviation B is expected to be greater than the absolute value of a charge/discharge command value based on the frequency deviation A.

Accordingly, to charge in the state of a small remaining capacity, the charge/discharge control device 302a increases the charge power by applying a charge/discharge command value based on the frequency deviation B. Also, to discharge in the state of a large remaining capacity, the charge/discharge control device 302a increases the discharge power by applying a charge/discharge command value based on the frequency deviation B.

As a result, the charge/discharge control device 302a is able to effectively utilize the resources of the storage battery 301. In addition, by using a power value that makes the system frequency approach the standard frequency as the charge/discharge command value, the charge/discharge control device 302a is able to reduce the load on other power generation systems that execute FR.

Note that in the present embodiment, the charge/discharge control device 302a uses the remaining capacity and a charge/discharge command value based on the frequency deviation B to switch between a charge/discharge command value based on the frequency deviation A and a charge/discharge command value based on the frequency deviation B. The charge/discharge control device 302a may also use the remaining capacity and a charge/discharge command value based on the frequency deviation A to switch between a charge/discharge command value based on the frequency deviation A and a charge/discharge command value based on the frequency deviation B.

In other words, the charge/discharge control device 302a may also calculate a charge/discharge command value based on the frequency deviation A first. Subsequently, if the combination of the remaining capacity and the charge/discharge command value based on the frequency deviation A corresponds to the range in FIG. 10 in which a charge/discharge command value based on the frequency deviation B is applied, the charge/discharge control device 302a may calculate a charge/discharge command value based on the frequency deviation B.

Embodiment 3

The charge/discharge control device according to the present embodiment decides a base point on the basis of the remaining capacity of the storage battery, and decides (selects) the charge/discharge command value on the basis of the decided base point.

FIG. 11 is a block diagram illustrating a charge/discharge control device according to the present embodiment. Compared to the charge/discharge control device 302a illustrated in FIG. 8, the charge/discharge control device 302b illustrated in FIG. 11 is additionally equipped with a base point deciding unit 309. Also, the charge/discharge control device 302b is equipped with a charge/discharge command value deciding unit 306b instead of the charge/discharge command value deciding unit 306a. Other structural elements are similar to the structural elements illustrated in FIG. 8.

The base point deciding unit 309 decides a base point on the basis of the remaining capacity. In an operation of making the system frequency approach a target frequency, the base point indicates the power that is charged/discharged by the storage battery 301 when the system frequency matches the target frequency. The target frequency is the base frequency or the standard frequency. In the present embodiment, the base point is used to calculate the charge/discharge command value. The base point deciding unit 309 decides the base point so that the remaining capacity does not approach 0% or 100%.

For example, if the remaining capacity is less than a threshold value E1, the base point deciding unit 309 calculates the base point on the basis of the following Eq. 12. Also, if the remaining capacity is greater than a threshold value E2 (where E1<E2), the base point deciding unit 309 calculates the base point on the basis of the following Eq. 13. If the remaining capacity is equal to or greater than the threshold value E1 but less than or equal to the threshold value E2, the base point deciding unit 309 calculates the base point on the basis of the following Eq. 14.

$$\text{Base point} = \text{constant } C \times (\text{remaining capacity} - \text{threshold value } E1) / \{100 - (\text{threshold value } E2 - \text{threshold value } E1)\} \quad \text{(Eq. 12)}$$

$$\text{Base point} = \text{constant } C \times (\text{remaining capacity} - \text{threshold value } E2) / \{100 - (\text{threshold value } E2 - \text{threshold value } E1)\} \quad \text{(Eq. 13)}$$

$$\text{Base point} = 0 \quad \text{(Eq. 14)}$$

The constant C in Eqs. 12 and 13 is arbitrarily set in advance. The constant C may be the maximum value of the charge/discharge power of the storage battery 301. If the threshold value E1 is 45% and the threshold value E2 is 55%, Eqs. 12 and 13 may be substituted with Eqs. 15 and 16.

$$\text{Base point} = \text{constant } C \times (\text{remaining capacity} - 45\%) / 90\% \quad \text{(Eq. 15)}$$

$$\text{Base point} = \text{constant } C \times (\text{remaining capacity} - 55\%) / 90\% \quad \text{(Eq. 16)}$$

In this case, if the remaining capacity is less than 45%, the base point deciding unit 309 calculates the base point on the basis of Eq. 15. Also, if the remaining capacity is greater than 55%, the base point deciding unit 309 calculates the base point on the basis of the following Eq. 16. If the remaining capacity is equal to or greater than 45% but less than or equal to 55%, the base point deciding unit 309 calculates the base point on the basis of the following Eq. 14.

In other words, if the remaining capacity is less than the threshold value E1 or if the remaining capacity is greater than the threshold value E2, the base point deciding unit 309 configures an offset determined by Eq. 12 or 13 and the like to the base point used to calculate the charge/discharge command value. As a result, if the remaining capacity is less than the threshold value E1, the base point deciding unit 309 decreases the discharge amount, and increases the charge amount. Also, if the remaining capacity is greater than the threshold value E2, the base point deciding unit 309 increases the discharge amount, and decreases the charge amount.

The charge/discharge command value deciding unit 306b uses the decided base point to decide (select) the charge/discharge command value. Specifically, the charge/discharge command value deciding unit 306b acquires the base point decided by the base point deciding unit 309, the frequency deviation A calculated by the frequency deviation calculating unit 305, and the frequency deviation B calculated by the frequency deviation calculating unit 305a. Subsequently, the charge/discharge command value deciding unit 306b decides the charge/discharge command value on the basis of the decided base point, the calculated frequency deviation A, and the calculated frequency deviation B.

For example, the charge/discharge command value deciding unit 306b calculates a power value indicating a charge/ discharge power to make the system frequency approach the standard frequency, on the basis of the frequency deviation B and the base point. If the calculated charge/discharge command value is less than or equal to 0 and the base point is less than or equal to 0, the charge/discharge command value deciding unit 306b decides the calculated power value as the charge/discharge command value. Also, if the calculated charge/discharge command value is equal to or greater than 0 and the base point is equal to or greater than 0, the charge/discharge command value deciding unit 306b decides the calculated power value as the charge/discharge command value.

Otherwise, the charge/discharge command value deciding unit 306b calculates a power value indicating a charge/discharge power to make the system frequency approach the base frequency, on the basis of the frequency deviation A. Subsequently, the charge/discharge command value deciding unit 306b decides the calculated power value as the charge/discharge command value.

The charge/discharge command value deciding unit 306b may also decide the charge/discharge variation range on the basis of the remaining capacity or the base point, and decide the charge/discharge command value on the basis of the decided charge/discharge variation range.

FIG. 12 is a flowchart illustrating operation of the charge/discharge control device 302b illustrated in FIG. 11.

First, the remaining capacity acquiring unit 308 acquires the remaining capacity of the storage battery 301 (S401). This operation is similar to Embodiment 2.

Next, the base point deciding unit 309 decides a base point on the basis of the remaining capacity of the storage battery 301 (S402).

Next, the system frequency measuring unit 303 measures the system frequency (S403). Next, the base frequency updating unit 304 updates the base frequency on the basis of the measured system frequency (S404). Next, the frequency deviation calculating unit 305 calculates the frequency deviation A indicating the difference between the updated base frequency and the measured system frequency (S405). Next, the frequency deviation calculating unit 305a calculates the frequency deviation B indicating the difference between the standard frequency of the power system and the measured system frequency (S406). These operations are similar to Embodiment 2.

Next, the charge/discharge command value deciding unit 306b decides a charge/discharge command value (power value) indicating a charge/discharge power to make the system frequency approach the standard frequency, on the basis of the frequency deviation B (S407). More specifically, the charge/discharge command value deciding unit 306b calculates the charge/discharge command value on the basis of the following Eq. 17.

Charge/discharge command value=frequency deviation $B$/−(appropriate frequency range)×charge/discharge variation range+base point (Eq. 17)

The frequency deviation B, the charge/discharge variation range, and the appropriate frequency range in Eq. 17 are similar to Eq. 8. If the appropriate frequency range is 0.2 Hz, the charge/discharge command value deciding unit 306b calculates the charge/discharge command value on the basis of the following Eq. 18.

Charge/discharge command value=frequency deviation $B$/−0.2 Hz×charge/discharge variation range+base point (Eq. 18)

If the calculated charge/discharge command value exceeds a predetermined maximum value, the charge/discharge command value deciding unit 306b uses the predetermined maximum value as the calculated charge/discharge command value. Also, if the calculated charge/discharge command value falls below a predetermined minimum value, the charge/discharge command value deciding unit 306b uses the predetermined minimum value as the calculated charge/discharge command value. The predetermined maximum value and the predetermined minimum value correspond to the maximum value of the charge/discharge power of the storage battery 301.

The charge/discharge command value deciding unit 306b may also modify the charge/discharge variation range on the basis of the base point so that the calculated charge/discharge command value does not exceed the predetermined maximum value and so that the calculated charge/discharge command value does not fall below the predetermined minimum value. Specifically, the charge/discharge command value deciding unit 306b may use a value obtained by subtracting the absolute value of the base point from the maximum value of the charge/discharge power of the storage battery 301 as the charge/discharge variation range.

Next, the charge/discharge command value deciding unit 306b determines whether or not the calculated charge/discharge command value is less than or equal to 0 and the base point is less than or equal to 0 (S408). Additionally, the charge/discharge command value deciding unit 306b determines whether or not the calculated charge/discharge command value is equal to or greater than 0 and the base point is equal to or greater than 0 (S409).

If the calculated charge/discharge command value is less than or equal to 0 and the base point is less than or equal to 0 (S408, Yes), or if the calculated charge/discharge command value is equal to or greater than 0 and the base point is equal to or greater than 0 (S409, Yes), the charge/discharge command value deciding unit 306b decides the calculated charge/discharge command value as the final charge/discharge command value.

Otherwise (No in S408 and No in S409), the charge/discharge command value deciding unit 306b decides a charge/discharge command value (power value) indicating a charge/discharge power to make the system frequency approach the base frequency, on the basis of the frequency deviation A (S410). More specifically, the charge/discharge command value deciding unit 306b calculates the charge/discharge command value on the basis of the following Eq. 19.

Charge/discharge command value=frequency deviation $A$/−(appropriate frequency range)×charge/discharge variation range+base point (Eq. 19)

In other words, the frequency deviation A is used instead of the frequency deviation B to calculate the charge/discharge command value. If the appropriate frequency range is 0.2 Hz, the charge/discharge command value deciding unit 306b calculates the charge/discharge command value on the basis of the following Eq. 20.

Charge/discharge command value=frequency deviation $A$/−0.2 Hz×charge/discharge variation range+base point (Eq. 20)

Similarly to the case of the frequency deviation B, if the calculated charge/discharge command value exceeds a predetermined maximum value, the charge/discharge command value deciding unit 306b uses the predetermined maximum value as the calculated charge/discharge command value. Also, if the calculated charge/discharge command value falls below a predetermined minimum value, the charge/discharge command value deciding unit 306b uses the predetermined minimum value as the calculated charge/discharge command value. The predetermined maximum value and the predetermined minimum value correspond to the maximum value of the charge/discharge power of the storage battery 301.

Also, similarly to the case of the frequency deviation B, the charge/discharge command value deciding unit 306b may also modify the charge/discharge variation range on the basis of the base point so that the calculated charge/discharge command value does not exceed the predetermined maximum value and so that the calculated charge/discharge command value does not fall below the predetermined minimum value.

Subsequently, the charge/discharge command value deciding unit 306b decides the charge/discharge command value calculated on the basis of the frequency deviation A as the final charge/discharge command value.

Next, the charge/discharge control unit 307 causes the storage battery 301 to execute charging/discharging that corresponds to the power indicated by the final decided charge/discharge command value (S411).

FIG. 13 is a diagram illustrating charge/discharge command values decided according to the operation illustrated in FIG. 12. To discharge in the state in which the base point is less than 0, a charge/discharge command value based on the frequency deviation A is applied. Also, to charge in the state in which the base point is greater than 0, a charge/discharge command value based on the frequency deviation A is applied. Otherwise, a charge/discharge command value based on the frequency deviation B is applied.

As discussed above, the absolute value of a charge/discharge command value based on the frequency deviation B is expected to be greater than the absolute value of a charge/discharge command value based on the frequency deviation A. In addition, if the base point is less than 0, sufficient charging is expected to be possible. Also, if the base point is greater than 0, sufficient discharging is expected to be possible. Also, if the base point is 0, sufficient charging/discharging is expected to be possible.

Accordingly, to charge in the state in which the base point is less than 0, the charge/discharge control device 302b increases the charge power by applying a charge/discharge command value based on the frequency deviation B. Also, to discharge in the state in which the base point is greater than 0, the charge/discharge control device 302b increases the discharge power by applying a charge/discharge command value based on the frequency deviation B. Also, to charge in the state in which the base point is 0, the charge/discharge control device 302b increases the charge/discharge power by applying a charge/discharge command value based on the frequency deviation B.

As a result, the charge/discharge control device 302b is able to effectively utilize the resources of the storage battery 301. In addition, by using a power value that makes the system frequency approach the standard frequency as the charge/discharge command value, the charge/discharge control device 302b is able to reduce the load on other power generation systems that execute FR.

Note that in the present embodiment, the charge/discharge control device 302b uses the base point and a charge/discharge command value based on the frequency deviation B to switch between a charge/discharge command value based on the frequency deviation A and a charge/discharge command value based on the frequency deviation B. The charge/discharge control device 302b may also use the base point and a charge/discharge command value based on the frequency deviation A to switch between a charge/discharge command value based on the frequency deviation A and a charge/discharge command value based on the frequency deviation B.

In other words, the charge/discharge control device 302b may also calculate a charge/discharge command value based on the frequency deviation A first. Subsequently, if the combination of the base point and the charge/discharge command value based on the frequency deviation A corresponds to the range in FIG. 13 in which a charge/discharge command value based on the frequency deviation B is applied, the charge/discharge control device 302b may calculate a charge/discharge command value based on the frequency deviation B.

Embodiment 4

The charge/discharge control device according to the present embodiment decides a base point on the basis of the remaining capacity of the storage battery, and decides the charge/discharge command value on the basis of the decided base point. Additionally, the charge/discharge control device according to the present embodiment suppresses the occurrence of reverse operation based on the application of the base point.

FIG. 14 is a block diagram illustrating a charge/discharge control device according to the present embodiment. Compared to the charge/discharge control device 302b illustrated in FIG. 11, the charge/discharge control device 302c illustrated in FIG. 14 is equipped with a charge/discharge command value deciding unit 306c instead of the charge/discharge command value deciding unit 306b. Other structural elements are similar to the structural elements of the charge/discharge control device 302b illustrated in FIG. 11.

The charge/discharge command value deciding unit 306c decides the charge/discharge command value. The operation of the charge/discharge command value deciding unit 306c is nearly the same as the charge/discharge command value deciding unit 306b of Embodiment 3. However, before deciding a charge/discharge command value based on the frequency deviation B as the final charge/discharge command value, the charge/discharge command value deciding unit 306c determines whether or not the charge/discharge command value based on the frequency deviation B indicates a power of reverse operation. Subsequently, if the charge/discharge command value based on the frequency deviation B indicates a power of reverse operation, the charge/discharge command value deciding unit 306c sets the charge/discharge command value to 0.

FIGS. 15 and 16 are flowcharts illustrating operation of the charge/discharge control device 302c illustrated in FIG. 14.

The operation illustrated in FIG. 15 is nearly the same as the operation of Embodiment 3. However, if the base point is less than or equal to 0 and the charge/discharge command value based on the frequency deviation B is less than or equal to 0 (S408, Yes), or if the base point is equal to or greater than 0 and the charge/discharge command value based on the frequency deviation b is equal to or greater than 0 (S409, Yes), the operation differs from Embodiment 3.

In this case, as illustrated in FIG. 16, the charge/discharge control device 302c determines whether or not the system frequency is less than the standard frequency (50 Hz) and the charge/discharge command value based on the frequency deviation B is equal to or greater than 0 (S501). Also, the charge/discharge control device 302c determines whether or not the system frequency is greater than the standard frequency (50 Hz) and the charge/discharge command value based on the frequency deviation B is less than or equal to 0 (S502).

Subsequently, if the system frequency is less than the standard frequency and the charge/discharge command value based on the frequency deviation B is equal to or greater than 0 (S501, Yes), the charge/discharge control device 302c decides the charge/discharge command value based on the frequency deviation B as the final charge/discharge command value. Also, if the system frequency is greater than the standard frequency and the charge/discharge command value based on the frequency deviation B is less than or equal to 0 (S502, Yes), the charge/discharge control device 302c decides the charge/discharge command value based on the frequency deviation B as the final charge/discharge command value.

Otherwise, the charge/discharge control device 302c sets the charge/discharge command value to 0 (S503). In other words, the charge/discharge control device 302c decides a charge/discharge command value set to 0 as the final charge/discharge command value.

On the basis of the combination of the above multiple conditions (S408, S409, S501, and S502), the charge/discharge control device 302c ultimately sets the charge/discharge command value to 0 if the base point is less than or equal to 0, the charge/discharge command value based on the frequency deviation B is less than 0, and the system frequency is less than or equal to the standard frequency. Also, the charge/discharge control device 302c sets the charge/discharge command value to 0 if the base point is equal to or greater than 0, the charge/discharge command value based on the frequency deviation B is greater than 0, and the system frequency is equal to or greater than the standard frequency.

FIG. 17 is a diagram illustrating charge/discharge command values decided according to the operation illustrated in FIGS. 15 and 16. Compared to Embodiment 3 illustrated in FIG. 13, FIG. 17 illustrates a prohibited range. In the prohibited range, the charge/discharge command value is set to 0. In other words, the charge/discharge command value is changed to 0.

As discussed above, in an operation of making the system frequency approach a target frequency, the base point indicates a charge/discharge power for the state in which the system frequency matches the target frequency. In addition, in some cases, the base point is decided to be a value other than 0 on the basis of the remaining capacity. By using such a base point to decide the charge/discharge command value, there is a possibility that reverse operation will occur.

Accordingly, if the charge/discharge command value indicates a power of reverse operation, the charge/discharge control device 302c sets the charge/discharge command value to 0. In other words, the charge/discharge control device 302c decides a value at which charging/discharging is not conducted as the final charge/discharge command value. During the control period in which a value at which charging/discharging is not conducted is decided as the charge/discharge command value, the charge/discharge control unit 307 does not cause the storage battery 301 to charge/discharge. In other words, the charge/discharge control unit 307 causes the storage battery 301 to stop charging/discharging. As a result, the charge/discharge control device 302c suppresses the occurrence of reverse operation based on the application of the base point.

Embodiment 5

The charge/discharge control device according to Embodiment 5 controls charging/discharging of the storage battery system via a communication network. Namely, for charging/discharging hereinafter, the configuration and operation of Embodiment 5 illustrated in FIGS. 18 and 19 will be described.

FIG. 18 is a system configuration diagram of a frequency control system including the charge/discharge control device according to Embodiment 5. FIG. 19 is a sequence diagram illustrating a process of a charge/discharge control device and a storage battery system according to Embodiment 5.

Compared to the structural elements illustrated in FIG. 2, FIG. 18 additionally illustrates a sensor 207 and a communication network 208. In addition, storage battery systems 204d and 206d as well as a charge/discharge control device 302d are illustrated instead of the storage battery systems 204 and 206 as well as the charge/discharge control device 302. The other structural elements of FIG. 18 are the same as the structural elements illustrated in FIG. 2.

In Embodiment 5, the charge/discharge control device 302d may be configured as an external controller provided externally to the storage battery system 204d, for example. Also, the charge/discharge control device 302d may be configured as a server, for example. In this case, the charge/discharge control device 302d may also control multiple storage battery systems 204d, 206d, and the like that are installed in a distributed manner in different locations.

The communication network 208 is a network for the charge/discharge control device 302d and the storage battery systems 204d and 206d to communicate with each other. For example, the communication network 208 may be constructed with a wired LAN conforming to a standard such as IEEE 802.3, a wireless LAN conforming to a standard such as IEEE 802.11a/b/g, or a public network such as a mobile phone network.

The sensor 207 is a sensor for measuring the system frequency. The charge/discharge control device 302d acquires information indicating the system frequency from the sensor 207.

The storage battery system 204d is equipped with the storage battery 301.

The storage battery system 204d includes a communication unit (not illustrated), which is a communication interface for communicating with the charge/discharge control device 302d via the communication network 208. The storage battery system 204d executes charging/discharging of the storage battery 301 under control by the charge/discharge control device 302d via the communication network 208.

Herein, the storage battery system 204d is equipped with a control unit (not illustrated). The control unit controls the storage battery 301 on the basis of a charge/discharge command value received from the charge/discharge control device 302d.

The configuration and operation of the storage battery system 204d is similar to the storage battery system 204, excepting the configuration and operation of being controlled via the communication network 208. Also, the storage battery system 206d has structural elements similar to the storage battery system 204d.

The charge/discharge control device 302d includes structural elements similar to any of the charge/discharge control devices 302, 302a, 302b, and 302c in Embodiments 1 to 4. Also, the charge/discharge control device 302d includes a communication interface for communicating with the storage battery systems 204d and 206d via the communication network 208.

For example, the charge/discharge control device 302d measures the system frequency via the sensor 207. Subsequently, the charge/discharge control device 302d controls the storage battery systems 204d and 206d on the basis of the measured system frequency via the communication network 208 so that charging/discharging is executed.

Excepting the configuration and operation that controls the storage battery systems 204d and 206d via the communication network 208, the configuration and operation of the charge/discharge control device 302d is similar to any of the charge/discharge control devices 302, 302a, 302b, and 302c in Embodiments 1 to 4.

Herein, the charge/discharge control device 302d controls the two storage battery systems 204d and 206d. The charge/discharge control device 302d may also control one storage battery system, or control three or more storage battery systems.

The charge/discharge control device 302d distributes the charge/discharge power to be executed overall among the storage battery systems 204d and 206d, and decides charge/discharge command values corresponding to the storage battery systems 204d and 206d. The charge/discharge control device 302d transmits the charge/discharge command values to the storage battery systems 204d and 206d, and controls charging/discharging in the storage battery systems 204d and 206d.

For example, the storage battery systems 204d and 206d each transmit a maximum value of charge/discharge power to the charge/discharge control device 302d via the communication network 208. The charge/discharge control device 302d receives the maximum values of charge/discharge power from the storage battery systems 204d and 206d. Subsequently, the charge/discharge control device 302d decides charge/discharge power values for the storage battery systems 204d and 206d that are proportional to the maximum values of charge/discharge power, and transmits the decided charge/discharge power values to the storage battery systems 204d and 206d as charge/discharge command values.

As a result, the charge/discharge control device 302d is able to cause each of the storage battery systems 204d and 206d to execute charging/discharging that corresponds to the maximum value of charge/discharge power.

In addition, the charge/discharge control device 302d may also acquire the remaining capacity from each of the storage battery systems 204d and 206d via the communication network 208, and control charging/discharging in the storage battery systems 204d and 206d on the basis of the remaining capacity, as indicated in Embodiments 2 to 4.

As above, the charge/discharge control device 302d according to the present embodiment is able to control multiple storage battery systems 204d and 206d via the communication network 208.

Note that, in the above respective embodiments, each structural element may be configured by dedicated hardware, or realized by executing a software program suited to each structural element. Each structural element may be realized as a result of a program execution unit such as a CPU or processor reading out and executing a software program recorded on a recording medium such as a hard disk or semiconductor memory. Herein, software that realizes a charge/discharge control device according to the above respective embodiments is a program like the following.

Namely, the program causes a computer to execute a charge/discharge control method including: measuring a system frequency of a power system per a predetermined control period; updating a base frequency per the control period according to the system frequency; calculating a first frequency deviation per the control period, the first frequency deviation indicating a difference between the base frequency and the system frequency; determining a first power command value that indicates a charge/discharge power to make the system frequency approach the base frequency according to the first frequency deviation; and causing a power storage system to charge/discharge power according to the first power command value. The base frequency updating step determines whether or not reverse operation will occur in the power storage system according to the base frequency, the system frequency, and a standard frequency of the power system, the reverse operation being charging/discharging that corresponds to a direction that moves the system frequency farther away from the standard frequency, in a case of determining that the reverse operation will not occur, sets a frequency obtained by applying a low-pass filter to temporal variation of the system frequency to the base frequency, and in a case of determining that the reverse operation will occur, sets the system frequency to the base frequency.

Additionally, a charge/discharge control device according to the above respective embodiments may control a lead battery, an NAS battery, a nickel-metal hydride battery, a redox flow battery, a lithium-ion battery, or a power storage system such as a flywheel as the above storage battery. Also, the charge/discharge control device may not only control charging/discharging in not only a stationary power storage system, but also a mobile power storage system such as in an electric vehicle (EV).

Also, the structural elements of the charge/discharge control device may also be circuits. These circuits may constitute a single circuit overall, or be respectively separate circuits. Also, each of these circuits may be a general-purpose circuit or a special-purpose circuit.

The foregoing thus describes a charge/discharge control device according to one or more aspects on the basis of the embodiments, but the present disclosure is not limited to these embodiments. Embodiments obtained by applying various modifications that may occur to persons skilled in the art as well as embodiments constructed by combining the structural elements in different embodiments may also be included within the scope of the one or more exemplary embodiments insofar as such embodiments do not depart from the spirit of the present disclosure.

For example, in the foregoing embodiments, a process executed by a specific processing unit may also be executed by a separate processing unit instead of the specific processing unit. Also, the order of multiple processes may be change, and multiple processes may also be executed in parallel.

INDUSTRIAL APPLICABILITY

The present disclosure is usable in a charge/discharge control device that conducts frequency regulation by controlling charging/discharging in a storage battery system, and is applicable to a frequency control device, a frequency regulation system, a storage battery system, and the like.

REFERENCE SIGNS LIST 201 distribution transformer
202 distribution line
203, 205 load
204, 204d, 206, 206d storage battery system
207 sensor
208 communication network
301 storage battery 302, 302a, 302b, 302c, 302d charge/discharge control device
303 system frequency measuring unit (frequency measuring unit)
304 base frequency updating unit
305, 305a frequency deviation calculating unit
306, 306a, 306b, 306c charge/discharge command value deciding unit (command value deciding unit)
307 charge/discharge control unit
308 remaining capacity acquiring unit
309 base point deciding unit.

What is claimed is:

1. A charge/discharge control device comprising:
a frequency measurer that measures a system frequency of a power system per a predetermined control period;
a base frequency updater that update a base frequency per the control period according to the system frequency;
a first frequency deviation calculator that calculates a first frequency deviation per the control period, the first frequency deviation indicating a difference between the base frequency and the system frequency;
a command value determiner that determines a first power command value that indicates a charge/discharge power to make the system frequency approach the base frequency according to the first frequency deviation; and
a charge/discharge controller that causes a power storage system to charge/discharge power according to the first power command value;
wherein the base frequency updater
determines whether or not reverse operation will occur in the power storage system according to the base frequency, the system frequency, and a standard frequency of the power system, the reverse operation being charging/discharging that corresponds to a direction that moves the system frequency farther away from the standard frequency,
in a case of determining that the reverse operation will not occur, sets a frequency obtained by applying a low-pass filter to temporal variation of the system frequency to the base frequency, and
in a case of determining that the reverse operation will occur, sets the system frequency to the base frequency.

2. The charge/discharge control device according to claim 1, wherein
the base frequency updater updates the base frequency by varying the base frequency by a fixed value in each control period for which the base frequency updater determines that the reverse operation will not occur.

3. The charge/discharge control device according to claim 2, wherein
if the system frequency is less than the standard frequency, the base frequency updater updates the base frequency by decreasing the base frequency by a fixed value in each control period for which the base frequency updater determines that the reverse operation will not occur.

4. The charge/discharge control device according to claim 2, wherein
if the system frequency is greater than the standard frequency, the base frequency updater updates the base frequency by increasing the base frequency by a fixed value in each control period for which the base frequency updater determines that the reverse operation will not occur.

5. The charge/discharge control device according to claim 1, wherein
the base frequency updater
determines that the reverse operation will not occur if the base frequency is included in an interval having the system frequency and the standard frequency as endpoints, and
determines that the reverse operation will occur if the base frequency is not included in the interval.

6. The charge/discharge control device according to claim 5, wherein
the base frequency updater
determines that the reverse operation will not occur if the base frequency is less than or equal to the standard frequency and greater than the system frequency, or if the base frequency is equal to or greater than the standard frequency and less than the system frequency, and
determines that the reverse operation will occur if the base frequency is greater than the standard frequency and equal to or greater than the system frequency, or if the base frequency is less than the standard frequency and less than or equal to the system frequency.

7. The charge/discharge control device according to claim 1, further comprising:
a remaining capacity acquirer that acquires information related to a remaining charge of the power storage system; and
a second frequency deviation calculator that calculates a second frequency deviation, the second frequency deviation indicating a difference between the standard frequency and the system frequency;
wherein the command value decider
uses the second frequency deviation to decide a second power command value that indicates a charge/discharge power to make the system frequency approach the standard frequency, and
uses the information related to the remaining charge to select a power command value from a plurality of power command values including the first power command value and the second power command value, and
the charge/discharge controller uses the selected power command value to cause the power storage system to charge/discharge power.

8. The charge/discharge control device according to claim 7, wherein
the command value decider
selects the second power command value as the power command value if (i) the remaining charge is less than or equal to a predetermined threshold value, and the second power command value does not indicate a discharge power, or if (ii) the remaining charge is equal to or greater than the predetermined threshold value, and the second power command value does not indicate a charge power, and
selects the first power command value as the power command value if (i) the remaining charge is greater than the predetermined threshold value, and the second power command value indicates a charge power, or if (ii) the remaining charge is less than the predetermined threshold value, and the second power command value indicates a discharge power.

9. The charge/discharge control device according to claim 1, further comprising:
a remaining capacity acquirer that acquires information related to a remaining charge of the power storage system;
a second frequency deviation calculator that calculates a second frequency deviation, the second frequency deviation indicating a difference between the standard frequency and the system frequency; and a base point decider that uses the information related to the remaining charge to decide a base point indicating a power charged/discharged by the power storage system when the system frequency matches the base frequency;

wherein the command value decider uses the first frequency deviation and the base point to decide the first power command value, uses the second frequency deviation and the base point to decide a second power command value that indicates a charge/discharge power to make the system frequency approach the standard frequency, and uses the base point to select a power command value from a plurality of power command values including the first power command value and the second power command value, and the charge/discharge controller uses the selected power command value to cause the power storage system to charge/discharge power.

10. The charge/discharge control device according to claim 9, wherein the base point decider configures an offset to the base point if the remaining charge is less than a first threshold value or if the remaining charge is greater than a second threshold value, and the command value decider uses the base point configured with the offset to decide the power command value included in the plurality of power command values.

11. The charge/discharge control device according to claim 10, wherein the base point decider, by configuring an offset to the base point, decreases a discharge amount corresponding to the power command value when the remaining charge is less than the first threshold value and the power command value indicates a discharge power, compared to the case of not configuring the offset to the base point, and increases a charge amount corresponding to the power command value when the remaining charge is less than the first threshold value and the power command value indicates a charge power, compared to the case of not configuring the offset to the base point.

12. The charge/discharge control device according to claim 10, wherein the base point decider, by configuring an offset to the base point, increases a discharge amount corresponding to the power command value when the remaining charge is greater than the second threshold value and the power command value indicates a discharge power, compared to the case of not configuring the offset to the base point, and decreases a charge amount corresponding to the power command value when the remaining charge is greater than the second threshold value and the power command value indicates a charge power, compared to the case of not configuring the offset to the base point.

13. The charge/discharge control device according to claim 9, wherein the command value decider selects the second power command value as the power command value if (i) the base point does not indicate a discharge power, and the second power command value does not indicate a discharge power, or if (ii) the base point does not indicate a charge power, and the second power command value does not indicate a charge power, and selects the first power command value as the power command value if (i) the base point indicates a discharge power, and the second power command value indicates a charge power, or if (ii) the base point indicates a charge power, and the second power command value indicates a discharge power.

14. The charge/discharge control device according to claim 9, wherein if the power command value indicates a power of the reverse operation, the command value decider selects a value for which the power storage system does not charge/discharge as a new power command value instead of the relevant power command value, and the charge/discharge controller causes the power storage system to stop charging/discharging in a control period in which a value for which the power storage system does not charge/discharge is selected as the new power command value.

15. The charge/discharge control device according to claim 13, wherein the command value decider selects a value for which the power storage system does not charge/discharge as the power command value if (i) the base point does not indicate a discharge power, the second power command value indicates a charge power, and the system frequency is less than or equal to the standard frequency, or if (ii) the base point does not indicate a charge power, the second power command value indicates a discharge power, and the system frequency is equal to or greater than the standard frequency, and the charge/discharge controller causes the power storage system to stop charging/discharging in a control period in which a value for which the power storage system does not charge/discharge is selected as the power command value.

16. A charge/discharge control method comprising:

measuring a system frequency of a power system per a predetermined control period;

updating a base frequency per the control period according to the system frequency;

calculating a first frequency deviation per the control period, the first frequency deviation indicating a difference between the base frequency and the system frequency;

determining a first power command value that indicates a charge/discharge power to make the system frequency approach the base frequency according to the first frequency deviation; and causing a power storage system to charge/discharge power according to the first power command value;

wherein the base frequency updating step determines whether or not reverse operation will occur in the power storage system according to the base frequency, the system frequency, and a standard frequency of the power system, the reverse operation being charging/discharging that corresponds to a direction that moves the system frequency farther away from the standard frequency, in a case of determining that the reverse operation will not occur, sets a frequency obtained by applying a low-pass filter to temporal variation of the system frequency to the base frequency, and in a case of determining that the reverse operation will occur, sets the system frequency to the base frequency.

* * * * *